(12) United States Patent
Treesh

(10) Patent No.: US 11,873,787 B2
(45) Date of Patent: Jan. 16, 2024

(54) PUSH TO START REMOTE START SYSTEM

(71) Applicant: Carey Treesh, South Bend, IN (US)

(72) Inventor: Carey Treesh, South Bend, IN (US)

( * ) Notice: Subject to any disclaimer, the term of this patent is extended or adjusted under 35 U.S.C. 154(b) by 0 days.

(21) Appl. No.: 16/913,983

(22) Filed: Jun. 26, 2020

(65) Prior Publication Data
US 2021/0071629 A1    Mar. 11, 2021

Related U.S. Application Data

(60) Provisional application No. 62/898,009, filed on Sep. 10, 2019.

(51) Int. Cl.
| | |
|---|---|
| *F02N 11/08* | (2006.01) |
| *B60R 25/24* | (2013.01) |
| *B60R 25/08* | (2006.01) |
| *B60R 25/04* | (2013.01) |
| *B60L 53/16* | (2019.01) |
| *B60R 25/34* | (2013.01) |

(52) U.S. Cl.
CPC .......... *F02N 11/0807* (2013.01); *B60L 53/16* (2019.02); *B60R 25/04* (2013.01); *B60R 25/08* (2013.01); *B60R 25/24* (2013.01); *B60R 25/34* (2013.01); *F02N 11/087* (2013.01); *B60R 2025/0405* (2013.01); *F02N 2200/022* (2013.01)

(58) Field of Classification Search
CPC .............. F02N 11/0807; F02N 11/087; F02N 2200/022; B60L 53/16; B60R 25/04; B60R 25/08; B60R 25/24; B60R 25/34; B60R 2025/0405

USPC ....................................................... 123/179.2
See application file for complete search history.

(56) References Cited

U.S. PATENT DOCUMENTS

| | | | | |
|---|---|---|---|---|
| 3,577,164 A | * | 5/1971 | Re Baratelli | F02N 11/0807 290/37 R |
| 3,793,529 A | * | 2/1974 | Bucher | F02N 11/0807 290/37 R |
| 3,859,540 A | * | 1/1975 | Weiner | F02N 11/0807 290/37 R |
| 4,236,594 A | * | 12/1980 | Ramsperger | F02N 11/0807 701/2 |
| 5,024,186 A | * | 6/1991 | Long | F02N 11/0807 307/10.6 |
| 5,736,935 A | * | 4/1998 | Lambropoulos | G07C 9/00309 340/426.36 |
| 5,990,800 A | * | 11/1999 | Tamaki | F02N 11/0807 307/10.6 |
| 6,983,726 B1 | * | 1/2006 | Luo | F02N 11/0807 49/31 |

(Continued)

*Primary Examiner* — Logan M Kraft
*Assistant Examiner* — John D Bailey
(74) *Attorney, Agent, or Firm* — David A. Belasco; Belasco Jacobs & Townsley, PC

(57) ABSTRACT

Full take over (FTO) of a vehicle permits a vehicle operator to remote start the vehicle, open one or more doors, enter the vehicle, and operate the vehicle without any engine shutdown. FTO may be achieved by a system for: detecting a remote start request, activating a key fob to allow for reading a security code, emulating an electrical brake pedal press, emulating an activation of the vehicle's start switch, and determining whether the vehicle is started. The vehicle driver may thereby unlock the vehicle, open the vehicle door, and drive the vehicle without the vehicle shutting down.

20 Claims, 10 Drawing Sheets

(56) References Cited

U.S. PATENT DOCUMENTS

| | | | | |
|---|---|---|---|---|
| 7,647,908 | B1* | 1/2010 | Biondo | F02D 28/00 123/179.2 |
| 7,650,864 | B2* | 1/2010 | Hassan | F02N 11/0807 340/901 |
| 8,096,482 | B2* | 1/2012 | Dage | B60H 1/00828 236/51 |
| 8,378,800 | B2* | 2/2013 | Mackjust | B60R 25/10 701/2 |
| 8,479,706 | B2* | 7/2013 | Speers | F02M 3/00 123/339.14 |
| 8,626,356 | B2* | 1/2014 | Davis | F02N 11/0807 701/2 |
| 9,017,216 | B1* | 4/2015 | Holub | B60W 10/06 477/94 |
| 2004/0168663 | A1* | 9/2004 | Matsuura | B60R 25/209 123/179.2 |
| 2004/0226529 | A1* | 11/2004 | Nantz | F02N 11/0807 123/179.2 |
| 2005/0263120 | A1* | 12/2005 | Fifelski | F02N 11/10 123/179.2 |
| 2007/0200667 | A1* | 8/2007 | Matsubara | B60R 25/04 340/13.23 |
| 2008/0068208 | A1* | 3/2008 | Hanselman | G08C 17/02 307/10.6 |
| 2009/0251284 | A1* | 10/2009 | Wilson | F02N 11/0807 123/179.2 |
| 2010/0108008 | A1* | 5/2010 | McCall | F02N 11/0807 123/179.2 |
| 2011/0073059 | A1* | 3/2011 | Flick | F02N 11/0807 340/425.5 |
| 2013/0268140 | A1* | 10/2013 | Du | G08C 17/02 701/2 |
| 2013/0268141 | A1* | 10/2013 | Du | G05D 1/0022 701/2 |
| 2014/0236402 | A1* | 8/2014 | Nomura | B60W 20/00 903/903 |
| 2015/0363988 | A1* | 12/2015 | Van Wiemeersch | H04M 1/11 455/557 |
| 2016/0368507 | A1* | 12/2016 | Geissenhöner | B60W 50/10 |
| 2017/0101076 | A1* | 4/2017 | Krishnan | B60R 25/2045 |
| 2018/0015905 | A1* | 1/2018 | Yorke | B60R 25/24 |
| 2018/0236997 | A1* | 8/2018 | Quix | B60W 50/0097 |
| 2018/0244262 | A1* | 8/2018 | Ruybal | B60K 6/48 |
| 2018/0340502 | A1* | 11/2018 | Boulais | F02N 11/0807 |
| 2018/0347532 | A1* | 12/2018 | Tamane | G07C 5/008 |
| 2018/0362019 | A1* | 12/2018 | Singh | F02N 11/0803 |
| 2020/0169832 | A1* | 5/2020 | Kwon | H04W 4/80 |
| 2020/0180744 | A1* | 6/2020 | Gonring | G07C 9/00896 |
| 2020/0310406 | A1* | 10/2020 | Lavoie | G05D 1/0016 |

* cited by examiner

PUSH TO START REMOTE START SYSTEM

CROSS-REFERENCE TO RELATED APPLICATIONS

This application claims the benefit of U.S. Provisional Application No. 62/898,009, filed on Sep. 10, 2019, entitled "Push to Start Remote Start System", the contents of which are incorporated herein by reference in their entirety.

FIGURES

FIG. 2 depicts the possible flows of operation for remote start requests while a vehicle is not plugged in.

FIG. 3 depicts the possible flows of operation for remote start requests while a vehicle is plugged in.

BACKGROUND

Figure 1:
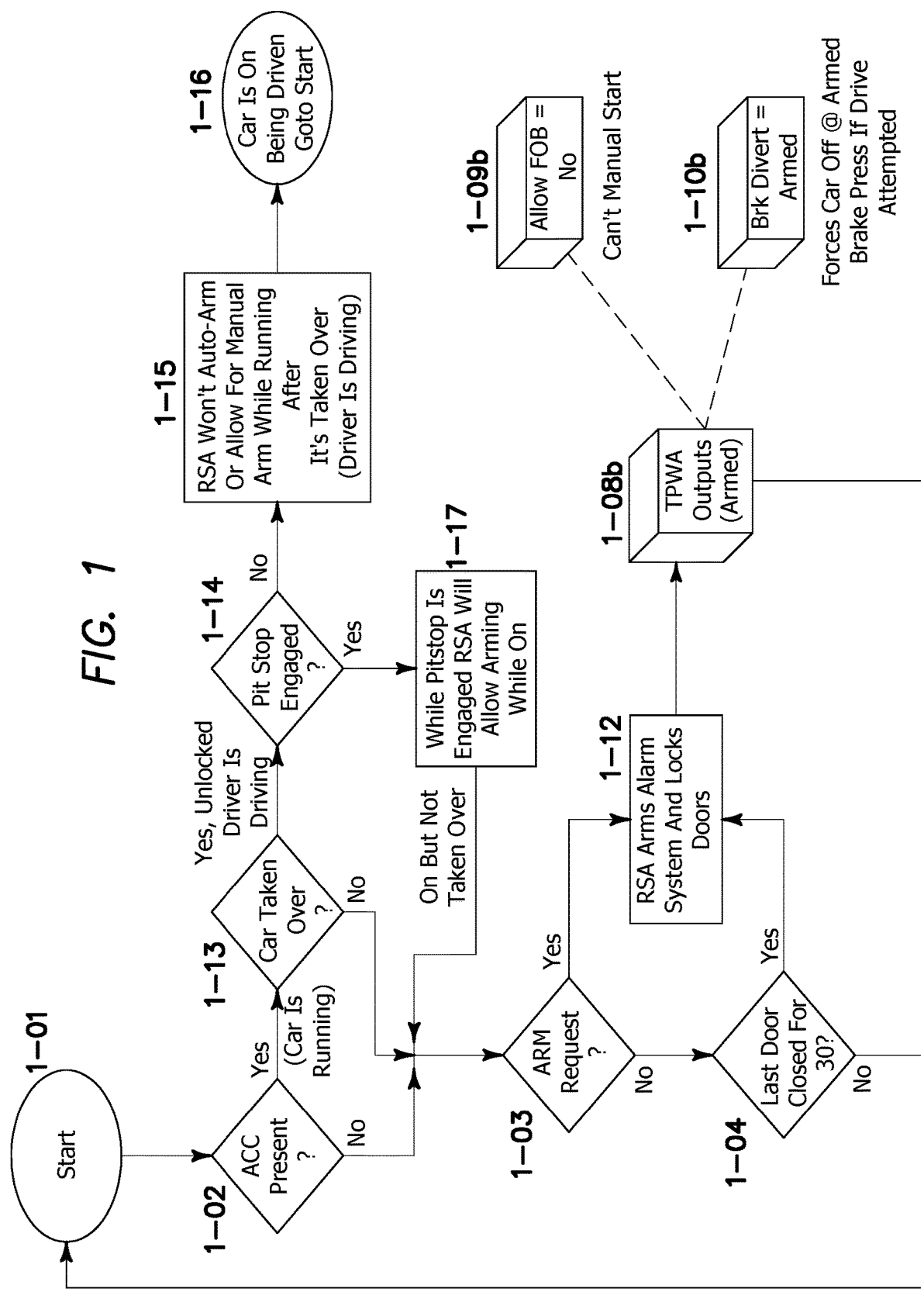
FIG. 1 depicts the flow of operation for arming and disarming a vehicle with an RSA system installed.
Figure 1:
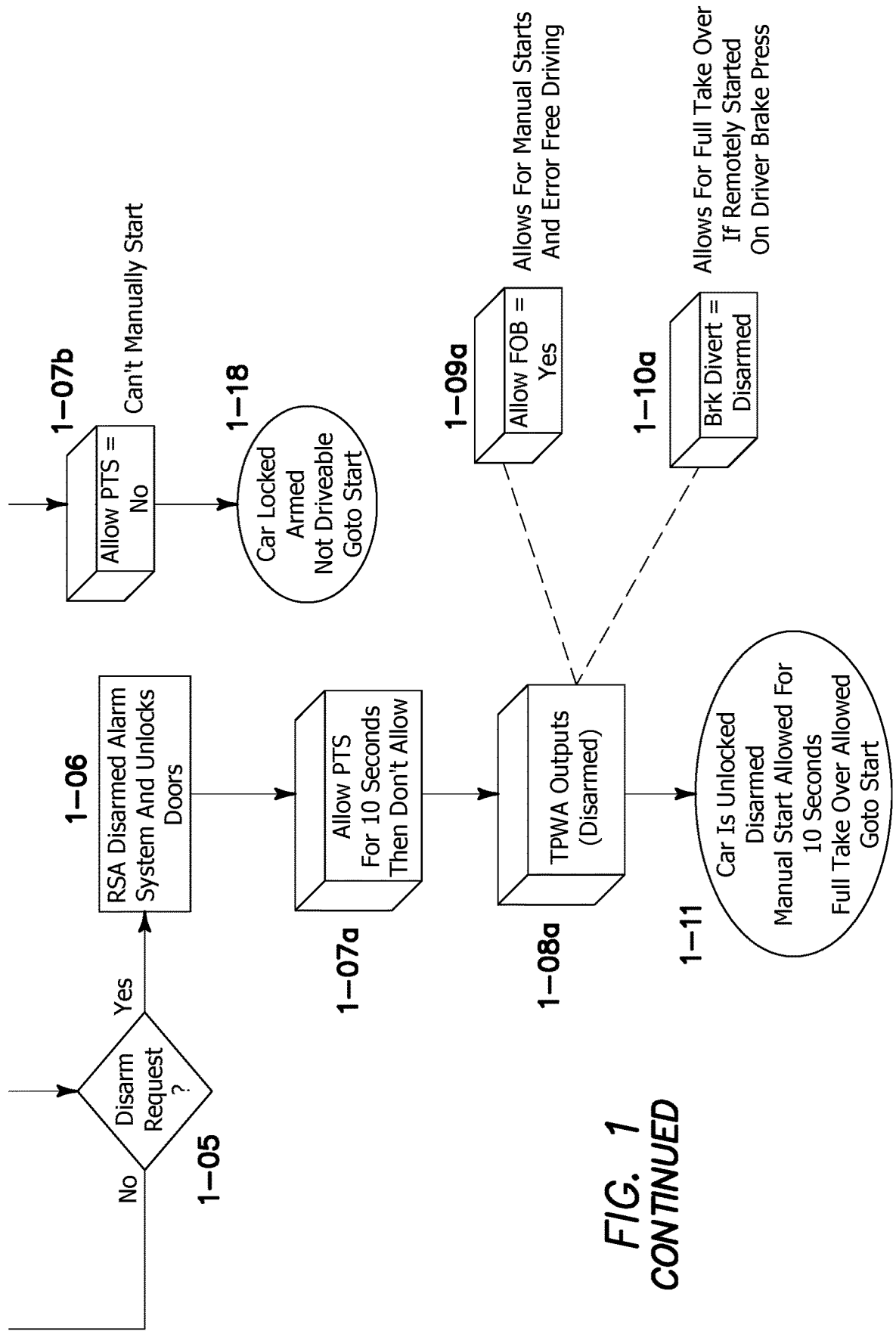

Vehicles may be used with aftermarket components or systems, which may be provided by third parties, and purchased after the original sale of the vehicle. One such aftermarket product is a remote start vehicle alarm systems (RSA) system. Compustar is one provider of RSA systems, but other RSA systems may be used. RSA systems typically provide an alarm system that is installed in the vehicle, and a key fob that may attach to the operator's key chain. The key fob may be used to wirelessly lock and unlock the vehicle, a process referred to as keyless entry.

Locking and unlocking the vehicle may also entail arming or disarming the RSA system, respectively. For example, the RSA system may listen for requests from the key fob to lock or unlock the vehicle, and may arm the alarm when the vehicle is locked, and disarm the alarm system when the vehicle is unlocked. This activates both the vehicle's internal security alarm, which may sound the vehicle's horn as a signal, and the siren provided with the RSA system, which will sound, for example, if a vehicle door is opened while armed, or if the RSA system detects another unauthorized entry attempt.

RSA systems also typically allow remote starting. Manual starting, however, may be restricted and only permitted when the system is disarmed.

A process known as full take over (FTO) may be desired by vehicle operators. FTO is the ability of a vehicle operator to remote start the vehicle, open one or more doors, enter the vehicle, and operate the vehicle without any engine shutdown. FTO offers benefits. For example, FTO permits the vehicle's heating or air conditioning system to remain activated, which helps maintain the interior temperature of the vehicle. FTO also avoids the additional time needed for the engine to shut down and then restart. FTO also avoids wear and tear on the vehicle's engine by reducing the instances of shutdown and startup.

Despite having benefits, FTO may reduce security if not implemented properly. For this reason, many vehicle models, including but not limited to the 2018 Toyota Prius plug-in, do not allow FTO as a built-in feature. Such vehicles would need to be modified somehow, for example by aftermarket components or systems, to support an FTO feature. Presently, there are no aftermarket systems that for allow FTO, which aspects of the present invention solve by providing such a system.

PREFERRED EMBODIMENTS

In one preferred embodiment, methods and systems are provided for remote starting a vehicle, comprising the steps of: detecting a remote start request, activating a key fob to allow for reading a security code, emulating an electrical brake pedal press, emulating an activation of the vehicle's start switch, and determining whether the vehicle is started. The method may further comprise the steps of a driver unlocking the vehicle, opening the door, and driving the vehicle without the vehicle shutting down. The remote start request may be received from an aftermarket key fob.

The preferred embodiment may also include steps for emulating an electrical brake pedal press comprising the step of modifying the vehicle's information regarding brake pedal status, emulating an activation of the vehicle's start switch comprising the step of using a press signal of a vehicle push start button, and determining whether the vehicle is started comprising one or more of steps for detecting a vehicle signal indicating a started vehicle, detecting a vehicle battery voltage, detecting revolutions per minute of the vehicle engine, or detecting data from the vehicle's tachometer. The preferred embodiment may detect whether an amount of time has elapsed, which may be approximately 4 seconds, and if the amount of time is elapsed, aborting the remote start attempt of the vehicle. The vehicle may, in one embodiment, be a Toyota vehicle supporting electric plug-in, but other vehicles are within the scope of the invention. The aftermarket key fob may in one embodiment be part of a Compustar remote start alarm system, or other remote start alarm system.

In another preferred embodiment, methods and systems are provided for remote starting a vehicle, comprising the steps of detecting a remote start request, detecting whether the vehicle has not already been started, attempting to start the engine by emulating a press of a key fob remote start button, wherein the emulated press is held for a duration of time, detecting whether the vehicle is started, and if the vehicle is not started, determining whether a time has elapsed since the attempt to start the vehicle, and if the time has not elapsed, attempting to start the engine again. The methods and systems may also comprise the vehicle being a hybrid vehicle having an electric plug for charging, wherein the vehicle is plugged-in. The remote start request may be received from an aftermarket key fob, and detecting whether the vehicle has not already been started may further comprise detecting a vehicle signal indicating a started vehicle. The emulated press may be held until the vehicle is started or fails to start. The vehicle may also be a Toyota vehicle, or other compatible vehicle.

DETAILED DESCRIPTION

FIG. 1 is a flowchart showing the process for arming and disarming the vehicle's alarm system, according to aspects of one embodiment of the invention. This process generally monitors the armed or disarmed state of the vehicle's RSA system, and allows for a secure FTO feature by ensuring that the vehicle can only be operated when the RSA system is disarmed, and when the driver possesses the aftermarket key fob. This prevents a vehicle that has been remotely started from being driven off by a person who does not possess the aftermarket key fob.

Generally, the process of FIG. 1 results in: (1) an arm of the system; (2) a disarm of the system; and (3) a check to see if the system can arm. Certain processes or features that exist in the vehicle or aftermarket RSA system are depicted in FIG. 1 as two-dimensional objects, whereas aspects that are added by embodiments of the invention are shown in FIG. 1 as three-dimensional objects.

Overview of RSA System Functionality.

At the entry point start (step 1-01), the vehicle can be in many possible states. These include remote started, taken over or not yet taken over, manually started, armed, disarmed, pit stop mode active or not active, plugged in or not plugged in. After start, the RSA system checks (step 1-02) if there is signal provided to it on the RSA's ACC input wire. This signal informs the RSA system if the vehicle is on and running or off. This signal tells the RSA system to allow for manual arming of the alarm as well as automatic arming after the last door has been closed for 30 seconds. If ACC is present that means the vehicle is on and running, preventing this unless in pit stop mode, as referenced in FIG. 1-17.

If the ACC signal is not present (step 1-02) that means the RSA is aware the vehicle is currently off and not running. The RSA system determines (step 1-03) if there is an arm request. This determines, for example, whether the driver has pressed the lock/arm button at the remote fob. If so, the RSA system arms the alarm and locks the vehicle doors (step 1-12). In step 1-12, the RSA system locks (and arms) the alarm. Upon an arm request, or 30-seconds after the last vehicle door is shut during passive arming, the RSA system will lock all doors and arm the alarm, which will sound if a break-in is detected.

If the driver has not pressed the lock/arm button at the remote fob, then RSA System checks if the last vehicle door has been closed for at least 30 seconds (step 1-04), and if so, automatically arms (and locks) the vehicle, unless the RSA system is taken over or is in pit stop mode. If no arm request, or automatic arming is needed at this time, then the RSA system checks if there is a disarm request (step 1-05). If not, the RSA system returns to the start state (step 1-01). If so, the RSA system proceeds to disarm the alarm system and unlock the doors, for example as requested by the unlock button of the key fob (step 1-06).

If the ACC signal is present (step 1-02), meaning the vehicle is running, the system determines whether the vehicle is taken over (step 1-13) aka been driven. If not, and the vehicle is still on but not yet taken over, flow continues at step 1-03 as described above. If so, the driver has already disarmed the vehicle, got in, pressed the brake while running and disarmed. (driver has fully taken over the remotely started car). Pit stop mode can only be engaged (step 1-14) if requested after a full take over has been completed and the vehicle is still on and running. If pit stop is engaged (step 1-17), the vehicle stays on, but the latch is dropped (see FIG. 2-10b) and the RSA system now allows for arming and auto-arming while staying on, and flow continues to step 1-17 onto step 1-03 as described above. If pit stop is not engaged (step 1-14), then the RSA system will not allow arming of the alarm (step 1-15), and flow starts over at the start position (step 1-01) with the vehicle on and in taken over state.

Additional Features

The present invention expands on the features of the RSA system described above. Continuing above with respect to whether there is a disarm request (step 1-05), if so, the RSA system proceeds to disarm the alarm system and unlock the doors, for example as requested by the unlock button of the key fob (step 1-06). Further, the FTO device allows for the on-board in-dash factory push-to-start button to be enabled for manual pressing (step 1-07a). By default, this process disables this button for extra vehicle anti-theft security. When ALLOW PTS (step 1-07a) sees an unlock/disarm request, it enables the vehicle's PTS button for 10 seconds for manual starting. After 10 seconds, it becomes disabled again. Once the vehicle has been started, ALLOW PTS keeps the button active for the driver to shut down the vehicle manually (step 2-32b).

Step 1-08a monitors the arm/disarm state of the RSA system and determines whether the vehicle is armed or disarmed. A signal is fed to ALLOW FOB (step 1-07a) and BRK DIVERT, as referenced in FIG. 2. In this context, the system allows the key fob to come online and allows for full take over on brake press while disarmed, as referenced in FIG. 2. Step 1-09a brings the on-board factory key fob online or offline based on signals provided to it from the TPWA process. In this case, it allows the fob to come online for manual starting and error free driving. Step 1-10a chooses to either allow full take over on disarmed brake press, or forces the vehicle to shut down on armed brake press. In this case, it allows for full take over as described in FIG. 2.

In step 1-11, the vehicle is unlocked (aka disarmed). Manual start is allowed for ten seconds, and full take over on disarmed brake press is allowed so long as the vehicle remains in this state.

The vehicle is unlocked/disarmed, and may be manually started for 10 seconds. It may also be currently in the remotely started state. If manually started full take over happens during that manual start (see FIG. 2-02). If remotely started, its waiting for a full take over (see FIG. 2-26). If remotely started, but not yet taken over, and disarmed, the operator has 30 seconds to get in, and press the brake pedal to take over the vehicle. If that does not happen, then the RSA will re-arm the car leaving the vehicle running in remote start mode. (see FIGS. 1-04 and 1-05).

Step 1-08b follows step 1-12(lock/arm) and monitors the arm/disarm state of the RSA system. It determines whether the vehicle is armed or disarmed. This signal is fed to ALLOW FOB (step 1-09b) and BRK DIVERT (see FIG. 2-28a) via FIG. 1-10b. In this context, it prevents vehicle theft while armed, and will not allow full take over at brake press while armed. Step 1-09b, brings the on-board factory key fob online or offline based on signals provided to it from the TPWA process. It disables the on-board factory key fob to prevent manual starting. Step 1-10b chooses to either allow full take over on disarmed brake press, or forces the vehicle to shut down on armed brake press. (See, for example, FIG. 2-32, which references an armed brake press).

In step 1-18, the vehicle is in a locked/armed state. It might be remotely started, but its not yet been taken over because no brake press has yet been detected. The vehicle maybe off at this point if no remote start request has been processed. The vehicle may also be remotely started but not yet taken over and thus can be shutdown if the alarm gets activated, the run time timeout is reached, or a remote stop request has been received. See FIGS. 2-31a and 2-31b.

Figure 2:
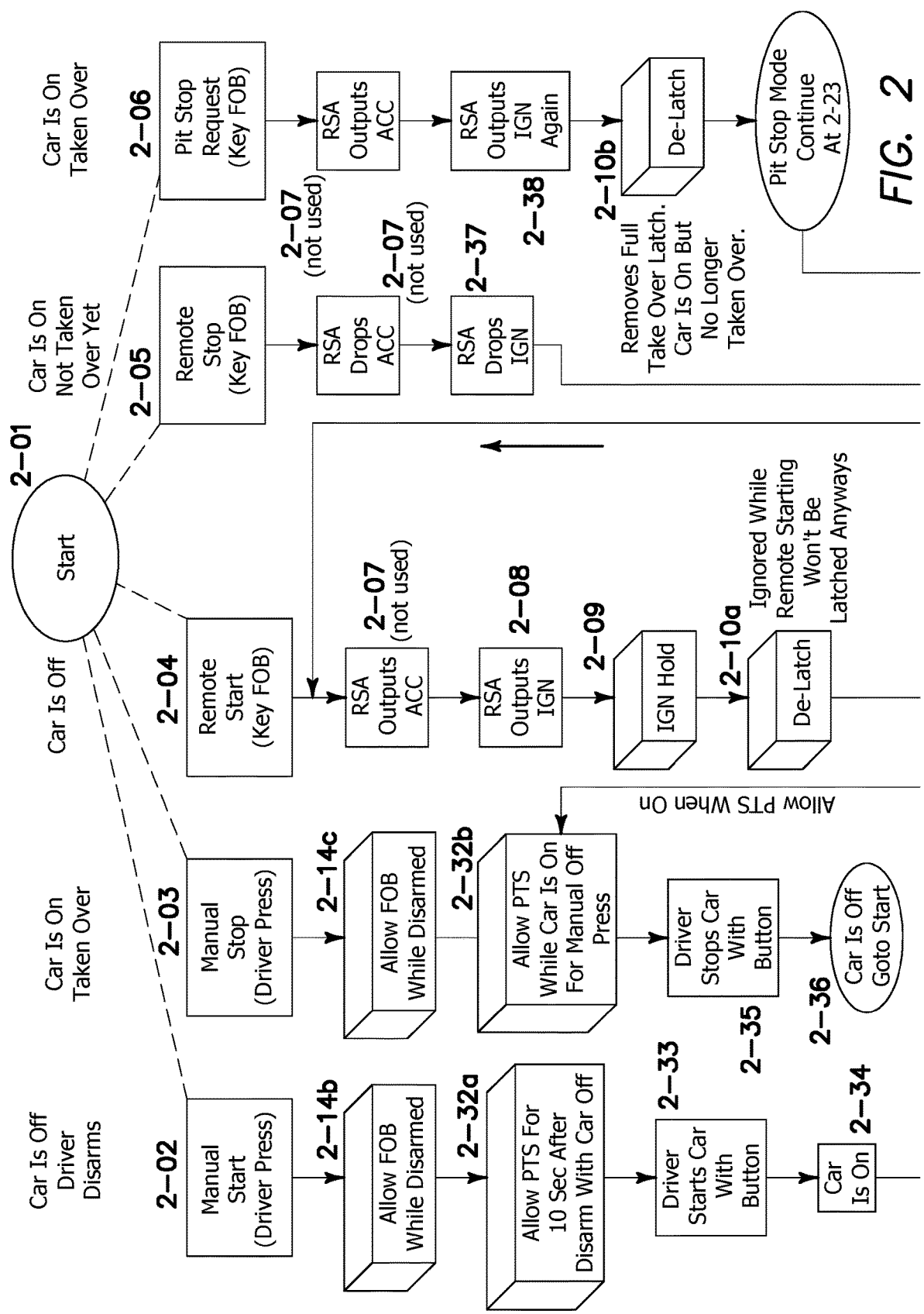
Figure 2:
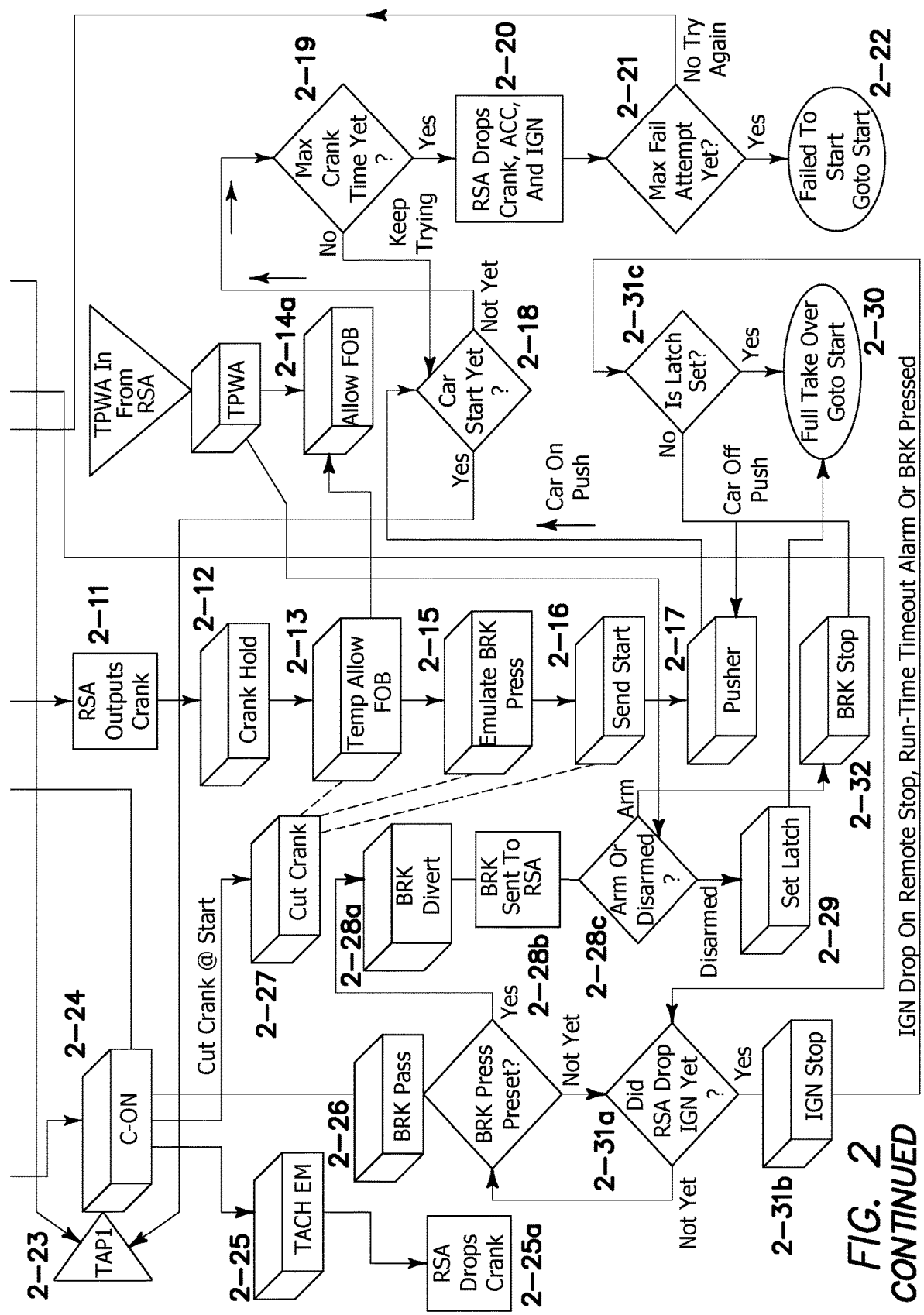

FIG. 2-2 Manual Start.

FIG. 2-2 is the manual start procedure for when the vehicle is not plugged in. This flow walks through the process of manually starting the vehicle with the FTO device installed and uses many of the same process as a remote start procedure just in a different context. Because manually starting the vehicle implies the operator intends to drive the vehicle upon starting, the FTO device needs to process this manual start as a full-take-over. As such it will use many of the same processes as remote start, and flow from that manual start all the way to fully taken over at disarmed brake press. Since a brake press is required to manually start a PTS vehicle anyways, this same brake press is used to invoke a full take over.

A manual start assumes the car is currently off, armed and locked. The operator is required to disarm/unlock the vehicle to get into it and start it. Upon the disarm the driver gets in, presses and holds the brake pedal as normal, and then presses the push to start button located on the dash. The FTO device responds to the drivers unlock/disarm request by allowing the on-board-factory key fob to come online for manual starting. (see FIG. 1-09*a*) Once the car has started, BRK PASS (FIG. 2-26) see's the driver's foot still on the pedal, and forwards this to SET LATCH (FIG. 2-28*a* 2-28*b*, 2-28*c* and 2-29), and now the car is manually started in full take over mode.

At step 2-01, the driver elects to manually start using the PTS button inside the car located on the dash. At step 2-02, the vehicle engine is off, the vehicle is locked and armed, and the driver chooses to manually start the vehicle rather then remote start it. To do this, the driver would need to first walk out to the vehicle and make sure that it is safe to unlock (and disarm) it. Then the driver would press the unlock (or disarm) button on the third-party key fob so that he or she can enter the vehicle without setting off the alarm. See FIGS. 1-06, 1-07*a* 1-08*a*, 1-09*a*, and 1-10*a*. At step 2-14*b*, when the vehicle is disarmed TPWA tells the ALLOW FOB process to bring the on-board factory key fob on-line so the vehicle can read its security code to allow for starting.

At step 2-32*a*, the vehicle is disarmed by the third-party key fob. This triggers the PTS button inside the vehicle to be enabled for human press. See FIG. 1-07*a*. When enabled by a disarm request, this is a limited time allowance, so the driver must press the PTS button within 10 seconds before its disabled again. If he is too late, he will need to press disarm button again to give him another 10 seconds. Note that this is the same ALLOW FOB process used in step 2-32*b*, and just shown here in the flow for reference in the context of manually starting the vehicle. At step 2-33, the driver presses the PTS button located on the dash of the vehicle while holding down the brake pedal to start the vehicle as normal. At step 2-34, the vehicle has been manually started and is now on and running.

At step 2-24, when the vehicle turns on, the TAP 1 connection point delivers voltage to the C-ON process, and C-ON will now recognize that the vehicle is on. The C-ON process sends this signal to multiple places, as described in FIG. 2-24. The process of 2-25 outputs voltage to the RSA system's ACC wire telling it not to allow arming while the vehicle is on. This includes passive arming (see FIG. 1-15). This C-ON also tells TACH EM to output 14 volts to the RSA systems tach input wire. This signal on the RSA's tach input wire is more important during remote starts then manual starts.

At step 2-32*b*, the C-ON enables and the PTS button to stay enabled the entire time that the vehicle is on and started. This allows for the driver to press the PTS button at any time to manually shut the vehicle off when done driving. (see FIG. 2-03 for manual off flow).

Step 2-27 is not used during manual start, because the RSA never needed to output crank during a manual start. This process is made active during a manual start, but has no effect in this context. This process comes into play during remote starting only.

Step 2-26 allows the currently held-down brake from the driver manually starting the vehicle to be passed as soon as the vehicle starts up.

Step 2-28*a* sends this manual brake press (from the driver manually starting the vehicle) to 2-28*b*. At step 2-28*b*, the manual start-related brake press is sent to the RSA.

Step 2-28*c* checks TPWA (see blow for a full description of TWPA) which will always show as disarmed during a manual start, so flow continues to 2-29.

At step 2-29, the latch gets set by this manual brake press needed for manual starting.

At step 2-31*a*, during manual starting, the RSA system never outputted an IGN, so this test will always show YES (IGN signal is missing) during manual starting, and flow will continue to step 2-31*b*.

Step 2-31*b* generates a shut down OFF-PRESS signal because it sees IGN is not present. It wants to shut off the manually started vehicle because IGN is missing. This off-press is sent to step 2-31*c*.

Step 2-31*c*, the latch will always bet set by the manual start brake press at steps 2-28*c* and 2-29. This blocks the off-press from reaching the PUSHER and flow terminates at step 2-30.

At step 2-30, the vehicle is now on via manual start, fully taken over, and will stay on until manually stopped or a pit stop request is made. Flow returns to step 2-01 and starts over, but vehicle is now on and taken over and can be driven.

Figure 3:
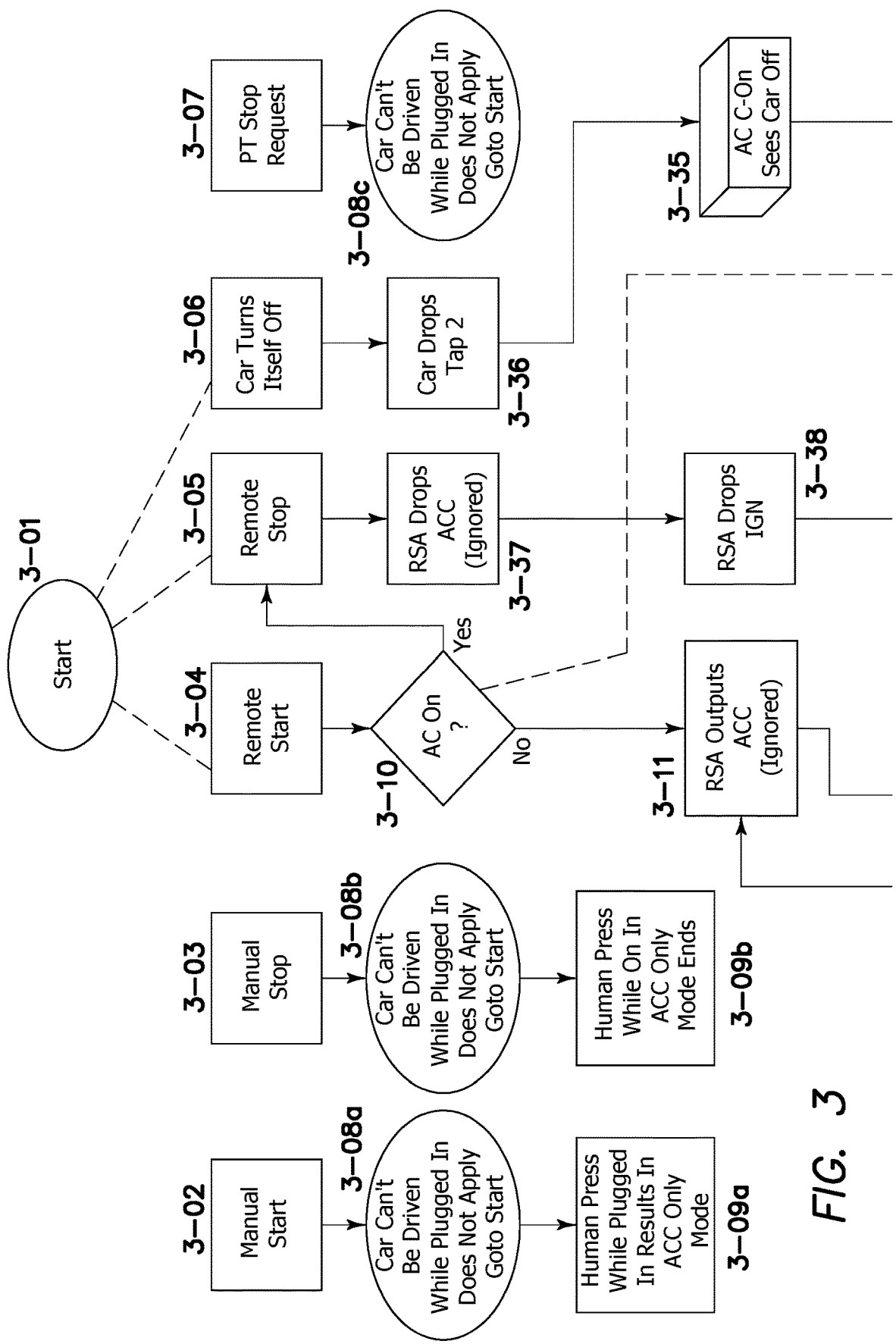
Figure 3:
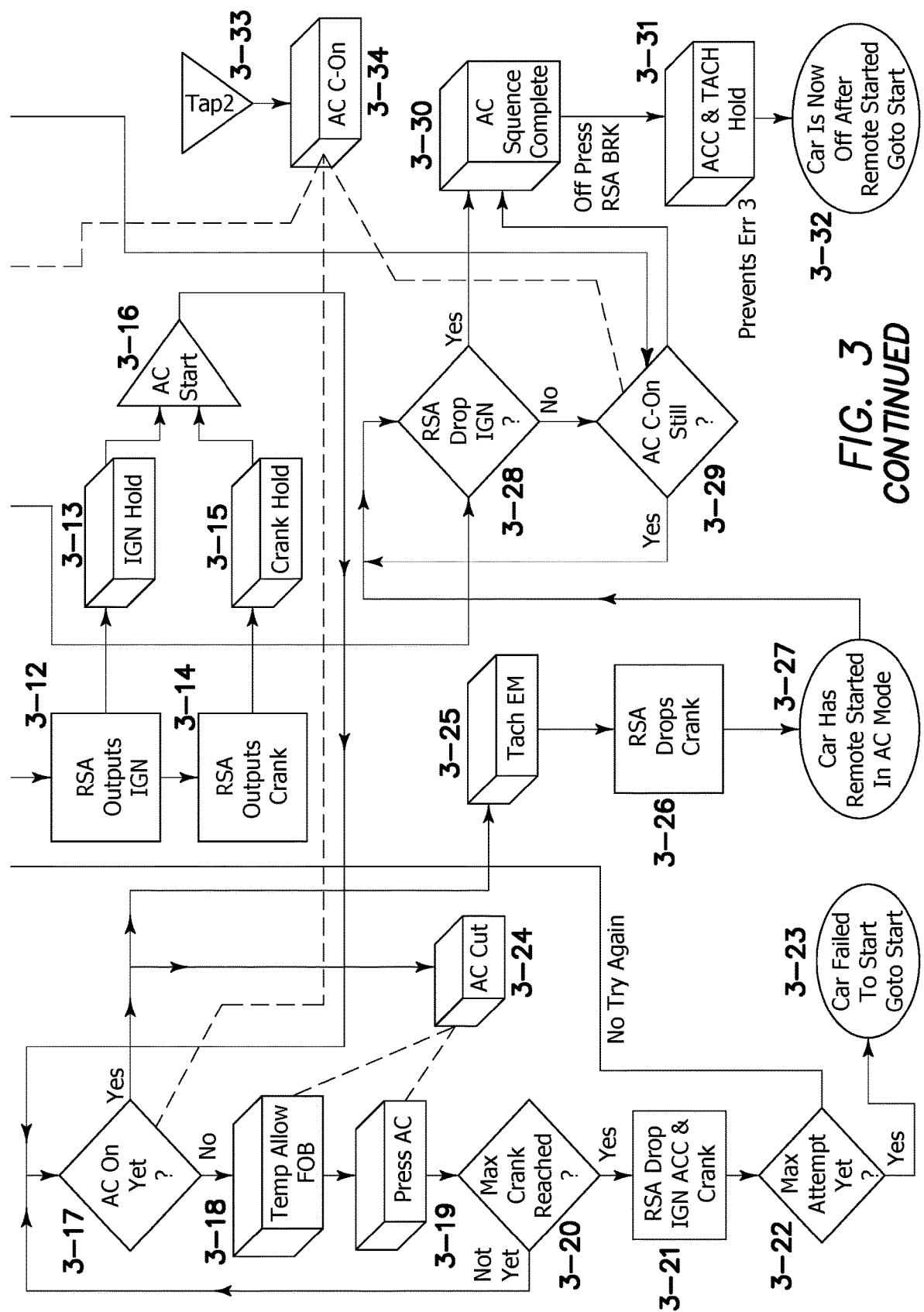

FIG. 2-03 Manual Stop (Off).

The flow through step 2-03 relates to a not plugged-in manual stop. At this point it is assumed that the car has been started either manually by the driver pressing the PTS button located on the dash board, or has remotely started the vehicle and has since got in, achieved full take over, and is now done with his trip and wish's to turn off the car by hitting the button on the dash manually. At step 2-03, the vehicle is currently on, and taken over, and driver has finished his trip, and is now ready to power the vehicle off manually by pressing the PTS button on the dash.

At step 2-14*c*, while the vehicle is on and running, the fob is always on-line and allowed to be seen by the vehicle. This is to prevent the vehicle's error message concerning not being able to find the factory key fob while driving. Note that this is the same process as steps 2-14*a* and 2-14*b*, and is just shown here in the flow chart again for reference. This ALLOW FOB process is not required to manually turn off the vehicle, but it will be allowed by default at this step because the vehicle is on and is waiting to be powered down by the driver. If the vehicle is on and taken over, it must be in the disarmed state, so TPWA will allow the on-board factory key fob to be on-line and recognized by the vehicle while the vehicle is on. This is required for manually started trips as well as remotely started trips.

At step 2-32*b*, while the vehicle is on and running, the process always allows the factory PTS button in the vehicle's dash to be enabled for a manual press, to allow the driver to turn off the running vehicle. If the vehicle is not running, then this button is disabled by the ALLOW PTS process (see FIG. 1-07*a* and 1-07*b*) for added anti-theft security. Note that step 2-14*b* is the same process, and is shown again here for clarity.

At step 2-35, the driver can shut off the vehicle anytime the vehicle is running, by pressing the PTS button on the dash.

At step 2-36, the vehicle is now off, and the flow-chart starts over again at step 2-01.

Note that whenever the vehicle is off, the following is also true: At step 2-23, no longer has power, and thus step 2-24 no longer provides power. Step 2-25 no longer sees the vehicle on, so it drops voltages to the RSA system's tach wire and to the RSA system's ACC wire. This allows the RSA system to know the vehicle is no longer on, and re-enables passive arming, which auto-arms 30 seconds after last door is closed when driver leaves the stopped vehicle.

Step 2-27 is disabled when the vehicle is off, allowing for the remote starting of the vehicle again when the crank signal is sent and held by steps 2-11 and 2-12 during a remote start request.

Step 2-32b is no longer seeing vehicle on, and therefore unless there is a disarm request from the 3$^{rd}$ party key fob, the vehicle's PTS button is no longer enabled, and any human press will be ignored. This is for anti-theft security. If the driver exits the vehicle after he turns it off and forgets to close the door, the vehicle will not re-arm itself. With the vehicle disarmed and the door open, the on-board key fob is still on-line, this process prevents someone from entering the vehicle and starting it. The PTS button cannot be used to start the vehicle manually again until the driver requests an unlock (disarm), and then it will only be allowed for ten seconds.

Step 2-26 no longer allows any brake pedal signals to pass into the FTO or to the RSA system. Brake pedal presses are always seen by the vehicle at this time, but will only turn on the brake lights and cannot be used to manually start the vehicle unless a fresh disarm/unlock request comes it allowing it for only 10 seconds. Step 2-32b will at this time prevent the vehicle from being manually started by pressing the brake.

Step 2-31b is disabled from sending IGN STOP when the vehicle is off.

Step 2-29 will release back to NOT LATCHED when the vehicle is off, and cannot be re-latched until vehicle is back on again, and then only if there is a disarmed human brake press.

Thirty seconds after the vehicle is off and the last door is closed, the vehicle will arm and lock itself. This will cause TPWA to take the on-board factory key fob off-line, preventing starting and opening the vehicle doors. (See FIGS. 1-04, 1-12, and 1-08b)

Figure 4:
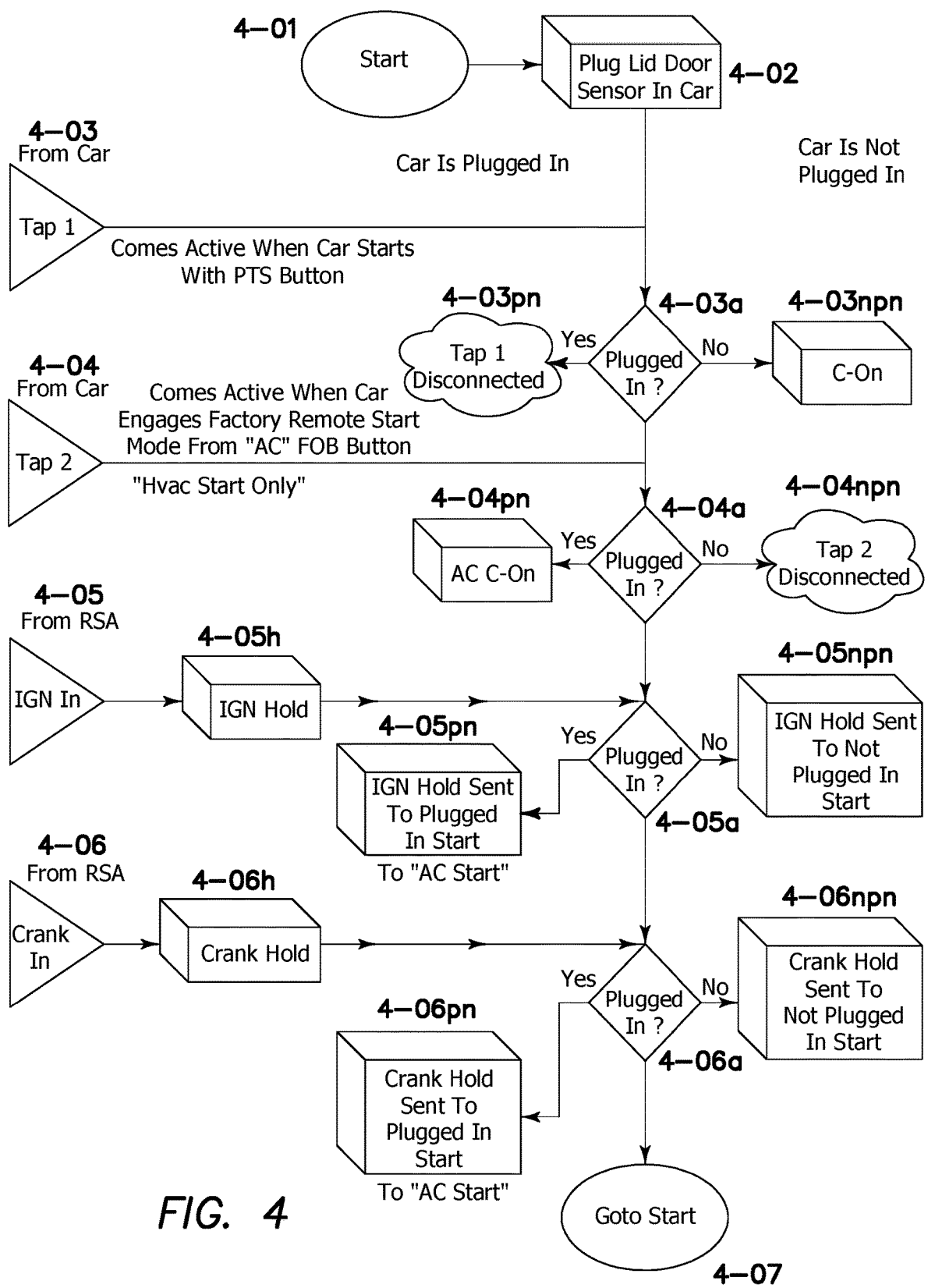
FIG. 4 depicts the background tasks used to determine if vehicle is plugged in, which in turn determines whether to invoke the flow described in FIG. 2, or to invoke the flow described in FIG. 3.

After the vehicle is manually powered off, flow continues back at step 2-01 waiting for the next event. With the vehicle off, the only possible actions would be a manual start (FIG. 2-02 flow) or a remote start (FIG. 2-04 flow). Remote Stop and Pit Stop are not possible while the vehicle is powered off.

FIG. 2-04 Remote Start.

The flow through step 2-04 relates to a not plugged-in remote start. At step 2-01, the driver elects to remotely start the car with the 3$^{rd}$ party key fob. The car is currently off, armed, and locked and not plugged-in.

At step 2-04, the button on the remote start key fob, when pressed, will be read as a remote start request because the vehicle is currently not running.

At step 2-07, the ACC voltage from the RSA system would be used to start the radio, fan, and other Accessory items in the vehicle on a traditional turn key system. Neither the vehicle nor the FTO make use of this RSA system signal from the RSA ACC line, it is ignored. Note that later when the FTO system outputs ACC voltage to the RSA system, that is a different case as described in TACH EM with reference to step 2-25.

At step 2-08, the IGN voltage from the RSA system is used to prep a traditional vehicle for starting by using this power to energize the spark plugs, fuel pump, computer, and other items needed to start the vehicle. This IGN voltage from the RSA system is not connected directly to a PTS type vehicle, but only to the FTO device.

At step 2-09, the process buffers the RSA system's IGN voltage and keeps it active two seconds longer then what the RSA system normally would. This is because of a small drop, or gap, in this signal during the cranking process. This extra two seconds covers this gap which otherwise would cause issues with the starting process. In this context, the IGN HOLD signal is shown directly connected to its normal, not-plugged in remote start locations. It is connected to "PLUG IN DIVERSION" so that it could be either sent here as shown, or diverted to the other flow chart in FIG. 3 if the vehicle were plugged in.

At step 2-10a, in the context of remote starting the vehicle this de-latch has no effect since the latch would not be set during remote starting in any event. This de-latch is used later, and has no effect at this time. Latching is used with setting full take over at disarmed brakes press which as not happened yet. De-latching is also used to set pit stop mode covered at 2-06 later in this document.

At step 2-11, this crank signal is used to operate the starter motor of a traditional turn-key type vehicle. The starter motor is used to get the engine moving, while IGN provides fuel and spark plugs. This CRANKING would start the older type turn-key vehicles. The RSA system limits this crank signal to about four seconds max, as excessive cranking could cause damage to the starter motor, and run the 12-volt battery down. The FTO uses this signal to trigger the start of the PTS vehicle. The RSA system's crank wire is not connected directly to a PTS-type vehicle, and is instead connects to the FTO device itself.

At step 2-12, because the four second max crank time may not last long enough to finish the other processes needed to start the PTS vehicle, this process adds an additional six seconds to the RSA system's crank signal time after it drops. This provides a total of ten seconds of crank signal which is more than enough time for the FTO device processes to successfully start a PTS vehicle. CRANK HOLD, (which exists in the plug-in diversion circuit is shown here for clarity), would be connected to "PLUG IN DIVERSION" so that it could be either sent here as shown, or diverted to the other flow chart in FIG. 3 if the vehicle was plugged in.

At step 2-13, because the driver is required to give up one of his factory key fobs to the FTO device, this process activates that on-board factory key fob for a short time, just long enough to allow the vehicle to read the factory security code, and then finish off the other starting processes. As soon as the vehicle has started, this TEMP ALLOW signal is terminated and the on-board factory key fob is once again disabled for security reasons. Also note that during remote start, the on-board PTS button is not enabled to a human press, so even during the few moments of remote starting while the key fob is allowed, it is still not possible to manually start the vehicle, which deters theft.

At step 2-14a, this process controls whether the on-board factory key fob will be enabled or disabled. Two signals are used. The first is the TEMP ALLOW FOB, which will allow the fob to come online just long enough to remote start the vehicle (see step 2-13). The second signal is from TPWA when the vehicle is disarmed. The TWPA is described with reference to FIG. 1. For reference, it is shown above ALLOW FOB on this flow chart and discussed below.

TPWA is the process used by the FTO device to determine if the vehicle is armed or disarmed. If armed, it sends a disable signal to ALLOW FOB. This blocks manual starting until the driver disarms the vehicle before a manual start. Until the vehicle is disarmed, the TPWA keeps the ALLOW FOB disabled for security. This disable can be temporarily overridden to allow for remote starting (see step 2-13). TPWA also informs another process called BRK DIVERT if the vehicle is armed or disarmed at brake press. This is used to allow full take over, or prevent the car from being driven after it is remotely started. This will be covered with reference to step 2-28*a*. TPWA is a different signal then the commonly provide "GROUND WHEN ARMED," and/or the commonly provided STATUS output of the RSA. Those provided RSA signals are not compatible with the FTO device because they always show ground during remote starting, even when the vehicle becomes disarmed.

Step 2-15 will emulate the press of the vehicle's brake pedal electrically. It does this by diverting the wires connected to the vehicle's brake light switch. It takes the diverted wires and opens and closes the proper wires to and from each other, so the vehicle sees a brake press needed to start the vehicle. It resolves the conflict of the current brake light switch sending NOT PRESSED signals into the vehicle at the same time as the emulated PRESSED signals are being sent by this temporary diversion away from the factory brake light switch. The conflict is resolved by this process. This emulation has no effect at all on the functions of the actual brake pedal other then to trick the car into seeing a brake press. The brake pedal will always engage the brake system of the vehicle.

At step 2-16, this process is used to start the vehicle by requesting an ON-PRESS from the PUSHER (see step 2-17). This push request is set up as a start request because the fob is allowed, and the brake pedal is pressed, and the vehicle is currently off.

At step 2-17, this process will perform a PRESS-AND-RELEASE of the vehicle's push to start button on the dash. This press puts a temporary SHORT CIRCUIT across the physical wires that need to be closed when the button is being pressed with a finger. Different vehicles or models may require a different configuration, for example, open instead of closed, or both open and closed on different sets of wires going to the physical button. The PUSHER process presses the button, but it is not aware if this press is to be an on-press or an off-press or an ignored press. That depends on other conditions present or missing at the time of the press. For example, if the vehicle is on, it will always be an off-press. If the vehicle is off, it will be an on-press only if the brake is pressed and key fob is allowed. All presses are a press-and-let-go even if the signal to the pusher is constant.

Steps 2-18 and 2-19 relate to the decision to keep cranking, or whether the vehicle is started yet. During remote starting, the RSA system needs to know when the vehicle has started. This can be done in a few ways. One way is to monitor the vehicle battery voltage for something greater than 13.0 volts. This works well on the non-plug in push-to-start vehicles. It is not very reliable, however, in hybrids, because the vehicle battery voltage even when running can be lower than 13 volts.

In older turn-key vehicles, the best way is to use the RSA system's tach input wire to look at the RPMs of the engine. This works because, during cranking, a much slower rotation during starting is detected versus the actually-started engine, which will be much higher in RPM's.

The last way is to use start detection on the RSA system's tach wire to determine an alternator voltage sense-start. During cranking, the slower speed of the alternator generates a lower voltage, but as soon as the engine comes to life, that voltage jumps due to the higher speed of the started engine spinning the alternator generating more voltage.

Despite the fact there is no alternator in a hybrid vehicle; the FTO uses this last type of vehicle-started detection system which is called alternator voltage sensing. The RSA system is therefore programmed to look for the alternator voltage.

Because this vehicle has no alternator, the RSA system tach wire is connected to the FTO device, and not to the vehicle itself. This connection happens at the TACH EM process covered below. This will be fully explained below, just for present purposes it suffices to note that this is how the RSA system knows if the push-to-start vehicle has indeed started yet or not during CRANKING.

The crank signal is present for four seconds. At step 2-18, this test is preformed inside the RSA system itself, which knows if the vehicle has stated or not based on input collected at its TACH INPUT WIRE connected to the TACH EM process. (see step 2-25) If yes, (started) flow jumps to step 2-23, but if not (failed to start) flow continues at step 2-19.

Next, we describe the flow for a failure-to-start scenario. At step 2-19, this test is the same as step 2-18, and if max crank time (four seconds max) has not yet been reached, then flow jumps back to step 2-18 and keeps trying. This loop between steps 2-18 and 2-19 are shown on the flowchart to show what is happening during this test for start. This loop will exit only on two possible outcomes: yes, the vehicle started—jump to step 2-23, or no, the vehicle failed to start within four seconds of max crank time output, and continue to step 2-20.

At step 2-20, if the vehicle fails to start within four seconds, the RSA system aborts this attempt by dropping all its startup signals to prepare to try again. ACC drop has no effect because we do not use it. CRANK drop will get buffered for six more seconds (see step 2-12) because four usually is not enough. If by chance the vehicle starts during this extra six seconds, flow will continue at step 2-23. If not, flow continues to step 2-21. IGN also gets dropped, but that has no effect if the vehicle has not yet remote started successfully.

At step 2-21, the RSA system will try three times to remote start the vehicle. If the third try fails, then it is a full abort with all start signals dropped (acc, ign, and crank) and flow terminates as a failed start at step 2-22.

If the attempt is not the last attempt (less then fail starts tried so far), flow jumps back to step 2-07 of the remote start sequence, and everything repeats in the exact same order as last time. The only possible exits are a successful start at step 2-18, which jumps to step 2-23, or a complete fail which jumps to step 2-22.

At step 2-22, a remote start request will terminate if three failed attempts are made but the vehicle never successfully started. Upon reaching this point, the RSA system will send back error code "1" to the third-party key fob (failed to start error code), and flow will jump back to step 2-01 for a complete start over with the vehicle off.

Next, we describe the flow when the vehicle is successfully started on a crank signal. At step 2-23, a point inside the vehicle's electrical system will only go HOT once successfully started. It should not read voltage on it during the starting process, but only after it has started. This is the signal that is fed into the C-ON In a hybrid, it is acceptable to use the vehicle's ACC wire for this, because this ACC wire will not go hot unless the vehicle has responded to a push-to-start request with a successful start.

Step 2-24 is the process which looks at the tap 1 to see if the vehicle is on or not. If no signal is preset at tap 1 (step 2-23), then C-ON will not give output to the processes connected to it. If TAP 1 is active that means the vehicle is indeed on. It is important that other processes on the FTO are aware of this. It is also important that the RSA system itself is aware of this. The C-ON signal is fed to the following processes, either activating them when on, or deactivating them when the vehicle is off or turns off TACH EM—tells the RSA system the vehicle is either on or off CUT CRANK—Used to shut down the processes used to get the vehicle started.

BRK PASS—Used to allow future brake presses into the FTO and RSA system.

ALLOW PTS—Used to allow the manual power off-press by the driver.

IGN STOP—Enabled IGN STOP when vehicle is on (otherwise not enable).

LATCH—Enables LATCH to be set and stay set while vehicle is on (de-latch if off).

All of these become active, or can become active while the vehicle is on, once the vehicle is off, all of these become deactivated and cannot become active again until the vehicle is back on.

At step 2-25, this process emulates the voltages that the RSA system needs to see on its tach input wire to know when the vehicle has begun to crank (meaning it is starting), then if it started or not started. First, it needs to see zero volts before any cranking starts. Next, it needs to see low voltage during the crank signal (starting). Lastly, it needs to detect +14 volts once the vehicle has been started (started). The low volts come from CRANK HOLD (before the hold), and the 14 volts comes from TACH EM triggered by C-ON.

Once the RSA system sees 14 volts, it will know the vehicle has started, and tells the RSA system to drop its CRANK output signal. This signal was held for six extra seconds by CRANK HOLD, and was used to start the vehicle via TEMP ALLOW, EMULATE BRK PRESS and SEND START. Four seconds may not have been long enough, and six seconds could be too long, but that is not an issue because of step 2-27 covered later.

TACH EM also outputs voltage onto the RSA system's ACC line. This voltage comes from the C-ON process. This tells the RSA system that the vehicle is on, and this prevents the vehicle from a being manually armed while on. It also prevents passive arming, i.e. auto arming 30 seconds after the last door is closed for driving the vehicle away. (see FIG. 1-15).

At step 2-25*a*, once TACH EM outputs 14 volts, the RSA system will drop CRANK, because it knows the vehicle has started. (stop cranking because it is started now) It will keep ACC (ignored) and IGN active for now until the remote start sequence is completed later by a passed brake press, or safety shutdown such as the alarm getting set off.

Next, we describe the flow for when the vehicle is started and running but not yet taken over. At step 2-32*b*, while the C-ON is active the vehicle's PTS button is always kept active and ready to respond to the driver's off-press, which occurs when he is done with the trip. This way, the driver will always be able to shut down a running vehicle.

At step 2-27, this process is used to cut-off the HELD CRANK SIGNAL coming from step 2-12. This crank signal comes from the RSA system during remote starting (step 2-11), but only lasts four seconds. CRANK HOLD adds six more seconds because four is not enough. Ten total seconds is probably too long, so once the vehicle is started, CUT CRANK blocks it exactly when it needs to. This will deactivate the TEMP ALLOW so the fob is no longer allowed (steps 2-13 and 2-14*a*). This also deactivates EMULATE BRK PRESS, so the brake pedal is LET GO and returns to normal operation (see step 2-15). It also deactivates SEND START at step 2-16, which releases the pusher at step 2-17 so that it is available for the next push, whether human or by the FTO device.

Note that soon after CRANK CUT activates, the TACH EM informing the RSA system the vehicle started via its tach input wire will cause actual the actual crank signal to drop. (see step 2-25*a*). Six seconds later CRANK HOLD drops. This extra six seconds is ignored now because of this CRANK CUT.

At step 2-26, this process only allows brake press signals to be passed AFTER it is activated by C-ON. This is required because if the RSA system saw the emulated brake press at step 2-15, then that would trigger the RSA system to end the remote start sequence before it was done. Since the vehicle needs to see a brake press to start, this BRK PASS blocks this STARTING BRAKE PRESS so that the RSA system will not shut down the vehicle before it is even finished remote starting it. The vehicle will ALWAYS see a brake press, but the RSA system and FTO will not ever see a brake press unless the vehicle is started and running. Brake presses are blocked from the RSA system and FTO by this process until the vehicle is on. Only then are they allowed to pass. BRK PASS checks to see if a human is pressing the pedal. So long as it is active, (car is on) it will keep checking, as a background task, until a pedal is pressed.

Step 2-31*a* is part of the IGN STOP process and it is working in a loop with BRK PASS. This loop between BRK PASS and IGN STOP keeps looping waiting for two possible exits. If a human presses the brake pedal, flow exits out of this loop to step 2-28 BRK DIVERT. If no brake press detected, flow keeps looping. The other possible exit is if the RSA system drops IGN. Should that happen, flow jumps to step 2-31*b* IGN STOP.

At step 2-31*a*, this process is enabled by C-ON and it is looking to see if the RSA system has dropped its IGN signal for more than two seconds (IGN HOLD adds two seconds at step 2-09). This will happen if:

Remote Stop Request comes in;

Run Time Time-Out is reached (45 mins);

Alarm gets Set off; or

Brake pedal is pressed (this will take 1 full second to drop IGN).

If any of these happen, then step 2-31*b* generates an OFF-PRESS request signal that will shut the car off via the PUSHER. This off-press first flows to step 2-31*c* before it can get to the pusher to shut down the car.

Step 2-31*c* is part of the "SET LATCH" process in step 2-29. The signal above gets sent to the pusher SHUTTING OFF THE CAR unless it is blocked by the latch being set. That latch will be set only if there was a disarmed brake press detected by "BRK DIVERT."

At step 2-28*a*, this process waits for a passed brake press from 2-26. It looks for this brake press as a background task. When it sees it, it jumps to 2-28*b*.

At step 2-28*b*, the human brake press is sent to the RSA system's brake input wire. This signals to the RSA system that the remote start job is complete. In a traditional turn-key vehicle, this simply makes the RSA system drop its ACC and IGN outputs, and the crank signal has already been dropped at step 2-25*a*. If the turned key is present and turned, the voltages from the RSA system are also provided by the turned key, and the vehicle will not take any notice of the RSA system dropping ACC and IGN so the vehicle will stay on. Therefore turn-key systems natively provide full take over at brake press by default.

If that turn-key were missing however, the drop of IGN would cause the remotely started vehicle to shut down upon that brake press. The turned key IGN voltage is missing, so the dropping of IGN at the RSA will cause the spark plugs to stop, and the fuel pump to stop. (No full take over, vehicle shuts down at brake press causing error #3). This is how full take over in an older turn-key type vehicle operates. The key must be inserted and turned before the diver presses the brake to allow full take over. This is known as key validation.

The FTO device ignores ACC from the RSA system, so it does not have any effect on the remotely started vehicle if it drops. IGN drop however is acted upon at steps 2-31a, 2-31b, and 2-31c. The RSA system takes about one full second before it drops IGN from a brake press.

At step 2-28c, BRK DIVERT knows if the vehicle is armed or disarmed by looking at the status of TPWA. If the vehicle is disarmed, then this brake press is fed into step 2-29 SET LATCH which engages full take over at disarmed brake press. If it is an armed brake press, it is passed to step 2-32 BRAKE STOP which shuts off the vehicle if this was an armed brake press.

Next, we describe the flow for when a disarmed brake press invokes full take over. At step 2-29, this sets a latch upon the first human disarmed brake press, and holds this latch set even after the brake pedal is released (aka LATCHED). Full take over is shown to be complete at step 2-30. However, step 2-28b sent that brake press to the RSA system's brake input wire at the same time it set the latch here. There is a one-second delay in the RSA system before it responds to this brake press by dropping ACC (ignored) and IGN.

Step 2-31a sees this IGN drop due to a brake press, and flows to step 2-31b, which generates the off-press request. Remote stop, run-time Timeout, and Alarm are all the same thing to the RSA system as a brake press. But in this case, we do not want the vehicle to turn off at brake press when the IGN drops because this time it is a valid full take over.

This off-press signal flows to step 2-31c, but this time the latch is set, so this off-press is blocked from the pusher. When the vehicle is on and taken over, flow returns to step 2-01 (start of flow chart with vehicle on and taken over).

Next, we describe the flow for an armed brake press, and shut down of the vehicle. Returning to step 2-28a, a brake divert will take the human brake press and step 2-28b will send it to the RSA system's brake input wire. In approximately one second, IGN will drop, step 2-28c checks the status of TPWA, and this time the vehicle is armed. This armed brake press is sent to step 2-32 BRK STOP. At step 2-32, this process sees that an ARMED brake press has come into "BRK DIVERT" and is fed here. This process forwards an off-press signal directly to the pusher (step 2-17) and the vehicle turns off at an armed brake press. (Preventing theft of the remotely started vehicle)

One second later, step 2-31a sees the RSA system drop ING because of the brake press sent by step 2-28b. It triggers step 2-31b to send an "ING STOP" off-press request. This flows to step 2-31c, and because the latch is not set this time, this sends an off-press to the pusher even though the vehicle is already pushed off by step 2-32. This second off press has no effect because if armed, the TPWA will not allow the on-board factory fob to be seen. With no active on-board factory key fob, the vehicles PTS button while already off does nothing. TPWA knows the vehicle is armed, which it must be, otherwise this brake press would have been diverted to the SET LATCH and this would have been a full take over instead of a shut down on brake press. The vehicle, when off, will go to start of flow chart (step 2-01). With the vehicle status as off and armed.

Next, we discuss the flow for the remote stop, time out, vehicle alarm set off, and how these shut down the vehicle. First, the vehicle is on, not taken over, armed and locked. Step 2-26 waits for human brake press. At step 2-31a, if a remote stop comes in, or the run-time time limit has been exceeded, or the alarm gets set off, then the RSA system will drop IGN. At step 2-31b, when RSA system drops IGN before any brake press then IGN STOP will send an off press to the pusher if the latch is not yet set. (Which it will not be if not taken over). At step 2-31c, flow follows the NO, because no disarmed brake press has come in. ING STOP'S off-press is sent to pusher. Step 2-17 turns off the vehicle in the case of a remote stop, run time timeout reached, or alarm is set off. Flow returns to start (step 2-01) now with the vehicle off.

FIG. 2-05 Remote Stop

From step 2-01, remote stop, the flow through step 2-05 relates to a not plugged-in remote stop. At step 2-01, the driver elects to remotely start the vehicle. At step 2-05, the vehicle has been remotely started, but not yet took over. At this time, the vehicle can be shut down by the driver pressing the remote start button again on the third-party key fob. This might happen if the driver realizes he does not need to make the trip after all.

At step 2-07, the RSA system will respond to this remote stop by first dropping the voltage signal on the ACC line. Any voltage provided from the RSA's ACC system into the FTO is ignored and has no effect. It is only shown here because this drop of ACC at remote stop does happen, despite that it has no effect. The vehicle is still running remotely-started.

At step 2-37, after the vehicle is remote started but not yet took over, the IGN signal is still being provided by the RSA system. The RSA system will keep this IGN signal on until one of the following happens:
  Remote stop requested;
  Run-time timeout reached;
  Alarm gets set off; or
  Brake pedal is sensed by the RSA system's brake input wire after one second delay.

Since this is a remote stop, the RSA system will drop IGN as soon as the driver requests a remote stop at the third-party key fob. This results in then IGN dropping. Flow continues at step 2-31a. While the vehicle is running after a remote start, but not yet taken over by a disarmed brake press, step 2-31a is looping with step 2-26 (BRK PASS loops with IGN STOP). The vehicle is waiting for the driver to press a brake, or for the RSA system to drop IGN. Since this is a remote stop, the RSA system will drop IGN, and the brake press will never come. Step 2-37 drops IGN at remote stop request.

At step 2-31a, the driver requested a remote stop at step 2-05, and the RSA system responded at step 2-37. Step 2-31b sees that the RSA system dropped IGN, and generates an off-press request to be sent to the pusher if not latched. At step 2-31c (no), the latch is not set during a remote stop, and this off-press request reaches the pusher. At step 2-17, this process presses and releases the vehicle's PTS button, and in this context the vehicle is turned off as a result. The vehicle is now off, and flow starts over at step 2-01.

Upon shutdown, TAP 1 drops, C-ON drops, TACH EM drops, CUT CRANK resets, BRK PASS blocks, IGN STOP loses power, and SET LATCH loses power. This is described in more detail below.

FIG. 2-06 Pit Stop Mode

The flow through step 2-03 relates to a not plugged-in pit stop. Pit Stop is a feature of the RSA system that allows the driver to exit his running vehicle after it is parked, leave it on, but re-arm it. This re-arm would not normally be allowed when the vehicle is on. The objective is to be able to leave the vehicle on and running, but have it locked and have full security with an active alarm system for the short break in the trip, like to mail a letter, or run inside to grab a forgotten item, or the like.

A user would use pit stop if he is making a quick stop in his trip, and wants to keep the vehicle on. If the user fails to engage pit stop mode, then he is leaving his running vehicle on with no security. Even if he locks it (assuming the system will allow this), without pit stop mode engaged, someone could break into the running vehicle and drive off with it. This is equivalent to leaving then vehicle running without an armed alarm.

Modern PTS cars may not even let you lock your car with the on-board factory key inside it. The RSA will not allow arming of the car while is on and taken over unless pit stop mode is engaged.

By default, the pit stop mode is defective on PTS type vehicles that would shut down on door opening. The pit stop feature is not able to shut down the running vehicle in the event of an alarm being set off (If manually started without the FTO device installed). Thus, the only fix to this security flaw is to force the vehicle to turn off upon door open. If pit stop is engaged, when the driver comes back to the running vehicle in pit stop mode, it will shut down when he opens the door for vehicle security reasons. The FTO device solves this problem and restores a fully functional pit stop mode as well as providing full take over remote starts.

At step 2-06, the driver has manually started, or remotely started the vehicle, and has already got into the vehicle by disarming or unlocking it, and has started his trip by putting the vehicle in gear. The brake press required to do that involved a disarmed brake press and that put the vehicle into full take over mode (see step 2-28c).

The vehicle is started and fully taken over. This also means that TAP 1, C-ON, TACH EM, BRK PASS, CUT CRANK, are all active, and the LATCH IS SET.

At step 2-07, the RSA system responds to a pit stop request by first bringing back its ACC output. This signal is not used by the vehicle or the FTO and is ignored. This has no effect on the already remotely-started taken over vehicle. At step 2-38, when the vehicle was fully taken over, the disarmed break press told the RSA system to drop IGN (see step 2-28b). This IGN signal is once again buffered by ING HOLD (step 2-09) and will stay active two extra seconds once RSA system drops it again in the future. The pit stop mode brings it back on (step 2-38) until pit stop mode terminates later.

At step 2-10b, the FTO device will also perform a de-latch operation every time it sees the RSA system bring IGN active. Since the latch was indeed set before this pit stop mode was requested, the FTO will now de-latch it. Note, step 2-10a is the same process as this, but it is drawn here in this flow because it is important on this occurrence. When pit stop mode is engaged, flow continues to step 2-23.

Next, we discuss termination of pit stop mode. Previously the vehicle was already on and taken over, now the vehicle is still on but no longer taken over. Step 2-23 tells C-ON that the vehicle is still on and running. At step 2-24, is still active, and step 2-32b is still enabled for the driver to manually turn off the vehicle. Step 2-25 is still active telling the RSA system that the vehicle is still on. However, because the RSA system is now in pit stop mode, the RSA system will now allow arming and passive arming of the vehicle even though it is on. (See step 1-17 in FIG. 1) This normally would not be allowed by the RSA system with the vehicle on and running. (See step 1-15 in FIG. 1)

At step 2-25a, because the vehicle was already on, the RSA system will not need to drop crank, as crank has already been dropped a long time ago or was never used at all if it was manually started. Step 2-27 is not used this time because this is a pit stop mode, and crank is no longer, or never was active. At step 2-28, the vehicle was already on, and still is, and subsequent human brake presses will be passed. Note, the vehicle is no longer taken over because of step 2-10b (DE LATCH), and IGN has returned to on again because of step 2-38, in which pit stop mode brings back IGN.

Assuming no brake press yet, at step 2-31a as in the case of remote starting a loop, this is running with step 2-26 (BRK PASS) waiting for a human brake press, or for the RSA system to drop IGN. Recall that the RSA system will drop IGN if a remote stop, run time timeout, alarm gets set off, or one full second after a human brake press. This underscores the objective of pit stop mode. All checks are once again enabled for full security while the vehicle is on and running and the operator is away from the vehicle. If the operator does not make it back to the vehicle within an amount of time (e.g. 45 minutes), the vehicle will turn itself off. If someone sets off the alarm, the vehicle will turn itself off. If the operator requests a remote stop, the vehicle will turn itself off. Additionally, if a person enters the vehicle and attempts to put it in gear without the key fob to disarm it, that armed brake press will turn off the vehicle, preventing theft. This could occur, for example, if the operator left pets or occupants inside the vehicle, or a window down during the pit stop.

Next, we describe three ways pit stop mode may terminate. The first is with a full take over from the valid driver. The second is with a vehicle theft attempt by someone trying to drive the running vehicle without out disarming it first. The third is by remote stop, run time timeout, or the alarm getting set off.

The flow for terminating pit stop mode with full take over (normal operation) is as follows. The driver disarms (unlocks) the vehicle to get back into the running vehicle running in pit stop mode. TPWA sees this disarm and allows factory fob so no errors will accrue on the dashboard while driving it. The driver opens door to get in without shut down. The driver steps on brake pedal to put into gear.

At step 2-26, this passes a brake press to BRK DIVERT. Step 2-28a, sees this valid disarmed brake press, and step 2-28b sends this brake press to the RSA system. RSA system will drop IGN in approximately one second. Step 2-28c sends disarmed brake press to set latch. At step 2-29, the disarmed brake press sets the latch to block out IGN STOP. Step 2-31a sees the passed brake press. Step 2-31b sees the RSA system has dropped IGN one second after it saw the brake press. At step 2-31c (yes), IGN STOP'S off-press request is blocked from pusher. At this point, the vehicle is fully taken over again, and flow returns to start (step 2-01). Pit stop mode has terminated. The vehicle is once again on and fully taken over by the operator.

The flow for terminating pit stop with attempted vehicle theft (armed brake press), is as follows. This might occur if the driver has left pets or children in the running vehicle during pit stop mode, or perhaps left a window down and someone tries to drive the vehicle off while in pit stop mode without setting off the alarm.

The Car is on, not taken over, armed and locked with pit stop mode engaged. Step 2-26 waits for a human brake press. Step 2-28a, sees brake press with vehicle armed. Step 2-28b, sends this brake press to the RSA system, and the RSA system will drop IGN in one second.

Step 2-32 gets the armed brake press and sends an off-press to pusher. Step 2-17 turns off the vehicle.

The vehicle turns off with armed brake press, as follows. Step 2-31a sees the RSA system drops IGN one second after brake press. Step 2-31b requests an off-press to the pusher if latch is not set. At step 2-31c (no), it is not set. Note that only a disarmed brake press can set it. Step 2-17 is an off-press from IGN stop. Note that if the vehicle is already off, this press is ignored. When the vehicle is now off, flow continues to step 2-01 (start).

The flow for terminating pit stop mode with remote stop, run-time timeout, or alarm set off, is as follows. This might happen if the driver is away from the vehicle for longer than the remote start run time limit (e.g., 45 minutes), or he chooses to abort the trip (remote stop), or someone attempts to break into the vehicle while running in pit stop mode and sets off the vehicle alarm.

The vehicle is on, not taken over, armed and locked and pit stop mode is engaged. Step 2-26 waits for human brake press. At step 2-31a, if a remote stop is detected, maximum run time has been exceeded, or the alarm gets set off, then the RSA system will drop IGN. At step 2-31b, when RSA system drops IGN before any brake press, then IGN-STOP will send an off-press to the pusher if the latch is not set. At step 2-31c (no), no disarmed brake press was detected. ING STOP's off-press is sent to the pusher. Step 2-17 turns off the vehicle if remote stop or and run time timeout are reached, or the alarm is set off.

When the vehicle is off, flow continues to step 2-01 (start).

FIG. 3-02 Plugged in Manual Start

FIG. 3-02 depicts the process of a manual start while plugged in. At step 3-02 is triggered if a person attempts to start the vehicle manually by pressing the brake pedal and pressing the PTS button while plugged in. At step 3-08a, the vehicle cannot be driven in this mode, and at step 3-09a, the vehicle will only start in ACCESSORY MODE. The HVAC systems of the vehicle will not start while plugged in if started manually.

FIG. 3-03 Plugged in Manual Stop

FIG. 3-02 depicts the process of a manual stop while plugged in. At step 3-03, if the driver presses the PTS button while the vehicle is operating in ACCESSORY-ONLY MODE, i.e. operator is listening to the radio while its charging, will then shut down that mode. At step 3-08b, the vehicle cannot be driven in this mode, and at step 3-09b, the human press will only be useful to terminate the ACCESSORY ONLY mode if started manually this way. It will also terminate a remote started vehicle while plugged in.

FIG. 3-04 Plugged in Factory Remote Start Mode

FIG. 3-04 depicts the process of a remote start while plugged in. At step 3-04, the driver requests a remote start on the third-party key fob while the vehicle is plugged in. At step 3-10, a check is made to see if the vehicle is already started while plugged in, if so, this request is processed as a remote stop instead and branches to step 3-05. Note that this is the same process in steps 3-35, 3-17, 3-29, and the main process is step 3-34. They are each drawn in context for clarity.

At step 3-11, any ACC signal on the line provided FROM the RSA system is ignored and is not used by the vehicle or the FTO device. In a normal turn-key type vehicle, this signal would provide power to the vehicle's accessories such as the fan and radio. It is not used while remote starting while plugged in.

At step 3-12, when the vehicle is plugged in, the IGN signal is passed to IGN HOLD where it is held for an extra two seconds after the RSA system drops it later. This IGN signal is used to both start the vehicle while plugged in, but also used to keep it running. The FTO device uses it as a test to see when the vehicle should be turned off later in the event of a vehicle alarm, time out, or remote stop. In traditional turn-key type vehicles, this signal would be used to provide power to the fuel pump, computer, spark plugs, and other parts of the vehicle needed to prepare it to be crank started.

At step 3-13, this process adds two extra seconds onto the IGN signal provided by the RSA system. This held signal is used to trigger the starting of the vehicle while plugged in, and is used later as a test to see if the vehicle should be kept running, or should be shut down later.

At step 3-14, this crank signal is sent to CRANK HOLD and then combines with the held IGN signal from IGN HOLD. While the vehicle is plugged in, this held crank signal just becomes part of the AC START signal used to get the vehicle started in its factory remote start mode. In a traditional turn-key type vehicle, this crank signal would be used to start the vehicle by running the starter motor. There is a four second max crank time, and the RSA system will know if the vehicle has started or not based on signals on its tach input wire so that it knows when to stop cranking after the vehicle has started.

At step 3-15, this process adds six seconds onto the crank signal after the RSA system drops it. This extra six seconds is for starting the vehicle while not plugged in, but has no effect on starting the vehicle now, while it is indeed plugged in. The held crank signal combines with the held IGN signal to form a signal called "AC START."

The letters AC refer to AIR CONDITIONING, because some manufacturers such as Toyota refer to both heating and cooling as air conditioning. Additionally, when the vehicle is plugged in, only the AC systems become active to heat or cool the cabin. Driving is not possible while plugged in, and thus this type of remote start on invokes the factory remote start mode—in other words, it remotely starts the vehicle's AC system. "AC" herein refers to the vehicle's cooling and heating systems.

At step 3-16, this is just a combo of both the held IGN plus the held CRANK signals that are used to get the vehicle started in factory AC mode. AC START is considered active if either or both of the 'held crank signal' or the 'held ign signal' are preset, and is only considered not active when both are missing.

The following flow describes an attempt to start the vehicle. At step 3-17, this is the same process that looks to see if the vehicle has successfully been started in the factory remote start mode ("AC" mode). If yes, it diverts flow to steps 3-24 and 3-25. If the vehicle is not on yet, flow continues at step 3-18 (temp allow fob). At step 3-18, this process over-rides a disabled on-board-factory-key fob being kept offline because TPWA tells the ALLOW FOB process to keep it offline while armed. Temp Allow Fob becomes activated by this AC-START signal generated at step 3-16, and brings the on-board factory key fob online just temporarily so that it can be used to request and authorize a factory remote start.

At step 3-19, the process also triggers off the AC-START signal generated at step 3-16 and electrically emulates a press of the on-board factory key fob's remote start button. This button is marked "AC" on Toyota key fobs. This press is held until the step 3-24 (ac cut) blocks it, and at that point the physical button released. Step 3-24 will not happen until the vehicle indeed starts and is detected at step 3-17. Until it starts, flow continues at step 3-20 (max crank reached yet?).

Step 3-20 is an internal test run inside the RSA system which is looking for the vehicle to turn on. The RSA system knows if this has happened or not based on signal provided to it on both its ACC wire and its TACH input wires. These signals come from step 3-25 (tach em). There is a four-second max crank time. If that time out has not been reached, then flow loops back to step 3-17. This loop holds TEMP ALLOW active as well as PRESS AC active holding the fob's "AC" (factory remote start button) down. This loop can only exit if four seconds has been reached (step 3-21) or if the vehicle starts (step 3-17).

At step 3-21, if the vehicle fails to start with in four seconds, the RSA system will abort the start to prepare to try again. As soon as IGN drops, IGN HOLD keeps it alive for two extra seconds. As soon as CRANK drops, CRANK HOLD kept it alive for six extra seconds. If by chance during these six extra seconds the vehicle should start, flow will jump back to step 3-17 and onto steps 3-24 and onto 3-25, If the vehicle fails to start during this 10 second total of AC START time, then flow continues to step 3-22.

The following flow describes if an attempt is failed. At step 3-22, the RSA system will check the failed number of attempts to start, and if has hit its max of three failed tries, it will continue onto step 3-23 (vehicle failed to start). If there are more attempts still to try, flow loops back to step 3-11 and the entire process is attempted again.

The following flow describes if the maximum failed attempt is reached. Step 3-23 is an attempted remote start failure after three attempts while plugged in. Flow starts over with the vehicle not running at step 3-01.

The following flow describes if a vehicle successfully starts in factory ac mode. Step 3-17 is part of the AC C-ON process which is monitoring to see if the vehicle indeed starts or not. As long as there is at least some IGN HELD or CRANK HELD generated at step 3-16 still active, the vehicle will continue to try to start via the TEMP ALLOW FOB and the PRESS AC processes, and these will continue to try to start the vehicle. Assuming it works, then the branch is taken at step 3-17 (*yes*).

Step 3-24 gets activated by the AC C-ON process when the vehicle comes on. Its job is to cut the ac-start signal away from the TEMP ALLOW FOB and from the PRESS AC processes. This releases the AC button (located on the factory key fob), and takes the on-board factory key fob offline, because now that the vehicle has started, these are no longer needed. Remember that "started" while plugged in just means the HVAC system has been remotely activated. The vehicle can not be driven from this "start". The plug must be removed before driving is allowed.

Step 3-25 also gets activated by the AC C-ON process and its job is to emulate the required signals in the proper order to tell the RSA system that the vehicle has indeed started. It outputs signals onto the RSA system's tach input wire, and the RSA system's ACC input wire. Note that the system ignores signals coming from the RSA system on ACC wire, but now we are providing signal to the RSA system on this same wire The system does not act upon its signal coming to it, and ignores it, but it acts upon signals provide to it.

At step 3-26, the RSA system will drop the crank signal when it sees the proper signal on its tach input and its ACC input wires. Knowing the vehicle has indeed started, it responds by dropping the crank signal. In a turn-key type vehicle, this drop in the crank signal would put a stop on the starter motor because the vehicle indeed started. In this remote start mode, Crank will drop from the RSA system as well, but it will not drop ACC (ignored) and will not yet drop IGN.

At step 3-27, the vehicle has now been successfully started in the factory ac mode. This remote start was requested by the third-party key fob, and that triggered the press of the on-board factory key fob's AC BUTTON remote starting the vehicle in its factory AC mode. AC C-ON activated TACH EM. The RSA system dropped crank. It also gave feedback to our two-way third-party key fob that the vehicle has started while plugged in. It is keeping ACC (which is ignored) and IGN active for now.

Step 3-28 is a check to see if the RSA system has dropped the IGN signal yet. This would only happen on a remote stop request, a run time timeout has been reached, the vehicle alarm was set off, or the RSA system detects a brake press. A brake press detect is not possible because of the "BRK PASS" (see FIG. 2) process is not activate while plugged in, but any of these other triggers might indeed happen. If they do, flow continues at step 3-30 (ac sequence complete). Assuming RSA system has not yet dropped IGN, flow continues at step 3-29.

Step 3-29 is a test to see if the vehicle itself is still running in factory remote start mode or not. If it has turned itself off, then flow also continues to step 3-30 (ac sequence complete). If the vehicle is still on, then flow loops back to step 3-28 where a check for IGN DROP is made again. This loop will run and can only exit if the RSA system drops IGN OR if the vehicle turns itself off. Why that might happen is described below.

Step 3-30 is executed when the factory remote start terminates for any reason. Condition one is tested at step 3-28 (rsa drops IGN?) while condition two is tested for at step 3-29 (did the vehicle turn itself off?). This means one of the following has happened:

| | |
|---|---|
| RSA Remote stop request | *rsa* ign drop |
| RSA system run time timeout reached | *rsa* ign drop |
| RSA alarm gets set off | *rsa* ign drop |
| Vehicle cabin temperature reached | *vehicle* off |
| Vehicle run time timeout reached | *vehicle* off |
| Vehicle PTS button pressed | *vehicle* off |
| Vehicle Brake pedal pressed | *vehicle* off |
| Vehicle door was opened (all but driver's door) | *vehicle* off |
| Vehicle charger door lid closes (see below *) | *vehicle* off |

This sequence first sends an off-press to the pusher. This would have the action of turning off the vehicle if it were an IGN DROP, otherwise the vehicle would already be off, and this off-push would have no effect on a vehicle that is already off. It would not turn the vehicle back on, because the on-board factory key fob would be disabled as well as the vehicle's brake pedal will not be being pressed at this time.

Next this process sends an emulated brake pedal press onto the RSA system's brake pedal input wire. This is to inform the RSA system that the vehicle has turned itself off. It also invokes the RSA system to run an internal test, checking to see if signals are still active on its ACC and TACH input wires or not. Lastly, this tells the RSA system to send a signal to the third-party key fob that vehicle is no longer remotely started.

At step 3-31, this process keeps the TACH EM process active for five extra seconds after the emulated brake press generated on the RSA system's brake pedal line in AC SEQUENCE COMPLETE. The RSA system will see signals on its TACH AND ACC input wires, thinking that the vehicle is still on after a brake press. This prevents error number three which otherwise would always be preset during remote starting while plugged in. This tricks the RSA system into thinking all self-shutdowns where from a driver pressing the brake, driving for five seconds and manually shutting down. This emulates a full take over. Remember that actual driving while plugged in is not allowed by the software of the car. Without actual driving, actual full take over is not possible after being remote started in this plugged-in-factory-HVAC-only mode.

At step 3-32, the remote start while plugged in was successfully triggered and successfully terminated by one of the above listed triggers. No error three was generated due to step 3-31. A jump is now made back to start (step 3-01) with the vehicle off.

While the vehicle is remotely started while plugged in, it is not possible to drive the vehicle. Pulling the plug will not terminate this remote start mode. however, closing the plug lid door will terminate the currently remote started vehicle in factory AC mode. This is because closing the plug lid door will trip PLUG-IN-DIVERSION to divert tap 2 back to not-plugged in mode, disconnecting it. (see FIG. 4) AC C-ON will respond by not seeing the vehicle on any longer, even though it is. Step 3-29 will then trigger AC-SEQUENCE COMPLETE which will shut down the vehicle via the PUSHER.

See below for remote-stop (step 3-05), and vehicle turns itself off (step 3-06).

Figure 5:
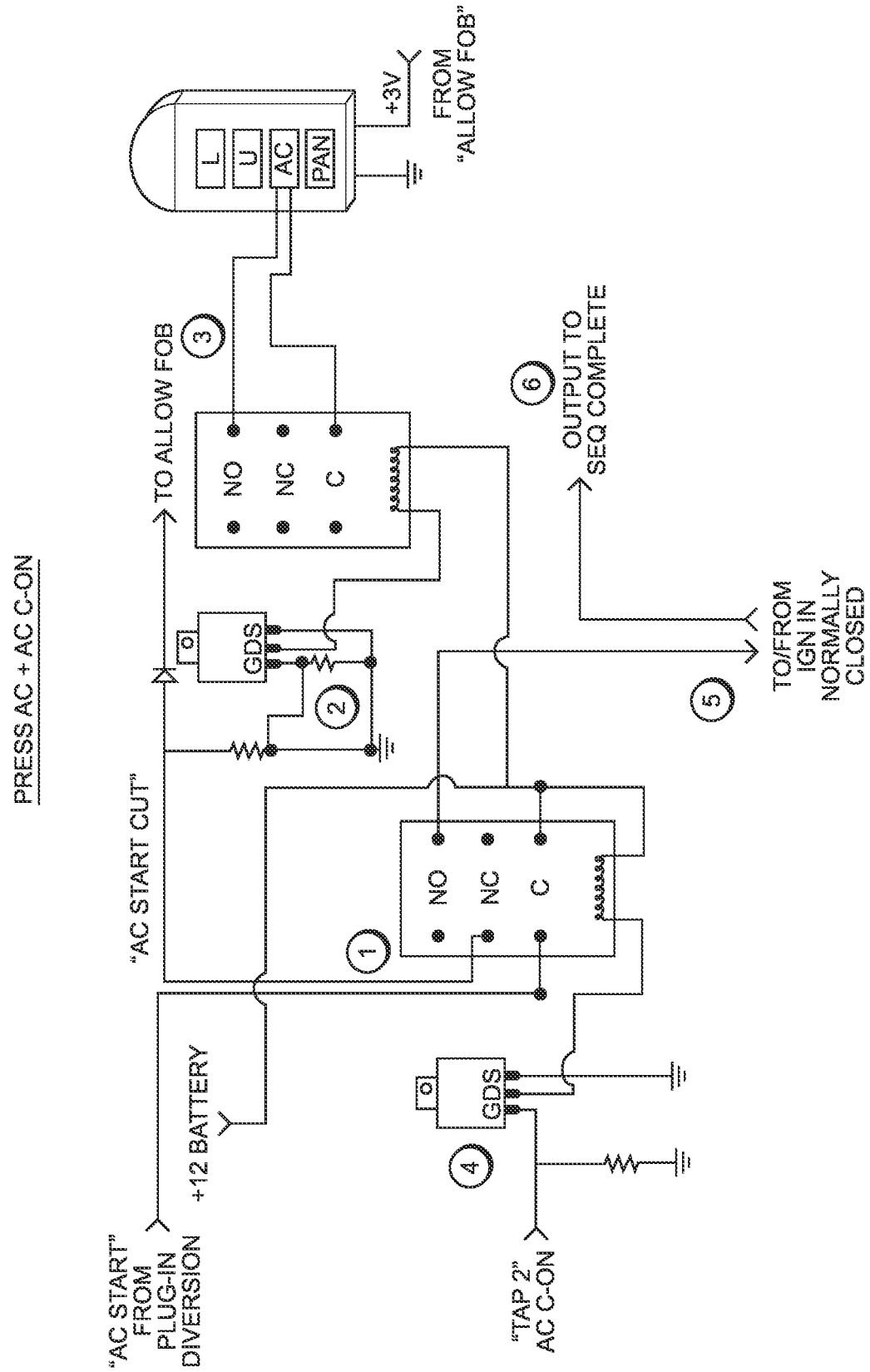
FIG. 5 depicts a schematic associated with Press AC+ACC-ON functionality.

FIG. 3-05 Remote Stop

FIG. 3-05 depicts the process of a remote stop, which includes the alarm getting set off or run time timeout being is reached. At step 3-05, after the vehicle has been successfully remote started in factory ac remote start mode at step 3-27, the driver may choose to request a remote stop. At step 3-37, the ACC signal coming from the RSA system is ignored and never used. This drop has no effect on the remotely started vehicle. At step 3-38, the RSA system next drops its IGN signal in response to the remote stop request. In a traditional turn-key type vehicle, this would drop voltage to the spark plugs and fuel pump, and assuming a remote stop was requested, that key would not be inserted. This loss of IGN would cause the vehicle to shut down. In the FTO design, that IGN drop will be acted upon at step 3-28.

The flow through steps 3-28, 3-30, 3-31, and 3-32 will shut down the vehicle and prevent error three on a remote stop request.

FIG. 3-06 Car Turns Itself Off

FIG. 3-06 depicts the process of a vehicle turning itself off. At step 3-06, the vehicle might turn itself off for any of the following reasons:
Vehicle cabin temperature reached
Vehicle run time timeout reached
Vehicle PTS button pressed
Vehicle Brake pedal pressed
Vehicle door was opened (all but driver's door)
Vehicle charger door lid closes (see above)

At step 3-36, tap 2 is a signal that is present when the vehicle factory remote started via the factory key fob's "AC" button. If the vehicle turns itself off then tap 2 will also drop. Tap 2 is active when the plug lid door is open (vehicle plugged in) at the same time keeping tap 1 disconnected. Tap 1 is only used for non-plugged in remote starts, and tap 2 is only used for plugged in remote starts. These are never active at the same time. At step 3-35, see steps 3-33 and 3-34. Flow continues to step 3-29.

At step 3-33, a wire inside the vehicle is tapped into that goes active when the vehicle is remotely started in its factory remote start mode invoked by the factory fobs "AC" button. This signal informs AC C-ON that the vehicle is on in this mode, or has been shutdown. The plug lid door must be open to permit plugging in. Step 3-29 sees ac c-on drop, step 3-30 tells the RSA system the vehicle is now shut off, and step 3-31 holds ACC and TACH long enough to prevent error 3. At step 3-32, the remote start was successful, and has terminated.

FIG. 3-07 Plugged in Pit Stop Request

FIG. 3-07 depicts the process of a pit stop request while plugged in. Step 3-08 is not a valid request while the vehicle is plugged in. Pit stop mode is not possible to request because the vehicle cannot be driven, meaning it was never TOOK OVER which is required to request pit stop mode. Pressing the remote start button again while not taken over will always invoke a remote stop.

FIG. 4

FIG. 4 depicts the process of a plug-in diversion. Plug in diversion is a simple process that monitors if the vehicle is currently plugged in or not. The FTO device needs to know this so that it can execute the correct remote start process. There are two possible remote start processes. They are the normal not-plugged-in mode, which features fully secure full take over from remote starting to driving with no shutdowns and includes functional pit stop mode. The other process is the plugged-in remote start mode which features being able to use the third-party key-fob to remote start the vehicle in the factory-remote HVAC-ONLY mode. The advantage this gives the driver is that he will not have to venture out to the plugged-in vehicle and remove the plug first before he can then remotely start the vehicle successfully with running heat or air. Without the use of the FTO device, the third-party RSA systems will fail to invoke the heater or air conditioner when a plugged-in remote start is attempted. Worse yet, it will falsely report success even when it is has failed.

The FTO uses several processes to accomplish both types of remote start modes. Both modes share some of the same processes, while at the same time, each remote start mode has specific processes as well.

To remote start in each mode, four total signals are used as follows. The TAP 1 signal is used to tell the FTO that the vehicle has been remote started and is only used for not-plugged-in remote starts (FIG. 2). The Tap 2 signal is used to tell the FTO that the vehicle has been remote started and is only used for plugged-in remote starts (see FIG. 3). IGN HOLD generates a signal with two extra seconds added onto it, and is used with both plugged-in and not-plugged-in remote start modes, but each use it in a different way. Lastly, CRANK HOLD generates a signal with six extra seconds after the RSA system drops its crank output. This held crank signal is used by both plugged-in remote start mode and not-plugged-in remote start mode. Each remote start mode uses it in a different way. Plug-in-Diversion routes all four of these signals to the proper remote start mode based on if the vehicle is plugged in or not plugged in. This is required because each remote start mode uses the four signals in a different way.

At step 4-01, this is the starting point of the flow chart. This entire process is always running as a back-ground task, not unlike FIG. 1 which is monitoring the arm/disarm status of the RSA system. This process is monitoring if the vehicle is plugged in or not, and this check is always running.

At step 4-02, this is the factory sensor in the vehicle located at the vehicle's plug in port. It is used to tell the vehicle if the plug lid door is open or not. A tap into this status signal, or other method that would indicate if the vehicle is plugged in is made generating a status signal and fed into this process to indicate if the vehicle is plugged in or not plugged-in. It is not good enough to know of the vehicle is charging or not, as that charge will terminate once the vehicle battery is fully charged. Instead we need a way to know if the physical plug is still inserted into the vehicle or not, even if it does not have active power on it. This tap-off does not interfere in anyway with the normal vehicle's ability to know if the door is open or not. The vehicle is not even aware of this tap-off or modification. This tap-off provides the needed signal to divert all four signals listed above to the correct places on the FTO device based on if the plug lid door is open or closed regardless of the status of the charge plug itself. The sensor itself is process that it directs that IS portion respect to the four signals it diverts.

The following flow describes TAP 1 diversion. Step 4-03 senses a wire from the vehicle that shows voltage on it when the vehicle has been turned on by a press of the vehicle's PTS button. It is used to trigger the C-ON process and is only used for not-plugged remote or manual starts. Step 4-03*a* is part of the PLUG-IN DIVERSION, which diverts the TAP 1 signal to either C-ON if not plugged in, or to disconnected if plugged in, since it is not used while plugged in. At step 4-03*pn*, if the vehicle is plugged in, the TAP 1 signal is diverted here, which is a simple float of the that signal, as it is disconnected from the FTO while plugged in. At step 4-03*npn*, the tap 1 signal is diverted to C-ON if not plugged in, for normal remote start and manual start operations (see FIG. 2).

The following flow describes TAP 2 diversion. Step 4-04 senses a wire from the vehicle that shows voltage on it when the vehicle has been remotely started by a press of the factory key fob's AC remote start button. It is used to trigger the AC C-ON process and is only used for plugged remote starts. Step 4-04*a* is part of the PLUG-IN DIVERSION, which diverts the TAP 2 signal to either AC C-ON if plugged in, or to disconnected if not-plugged-in, since it is not used while not-plugged in. At step 4-04*pn*, the TAP 2 signal is diverted to AC C-ON if plugged in, for plugged-in remote operations (see FIG. 3). At step 4-04*npn*, if the vehicle is not plugged in, the TAP 2 signal is diverted here, which is a simple float of the that signal, as it is disconnected from the FTO while not-plugged-in.

The following flow describes IGN diversion. At step 4-05, a signal comes from the RSA system and is used to both start and stop the vehicle remotely. It used by both plugged-in and not-plugged-in remote start modes. Step 4-05*h* adds two extra seconds onto the RSA system-provided IGN signal, and this HELD IGN signal gets diverted to the proper remote start process based on if the vehicle is plugged-in or not-plugged-in.

At step 4-05*a*, the HELD IGN signal is diverted to the correct remote start mode based on if the vehicle is plugged-in or not-plugged-in. At step 4-05*pn*, the HELD IGN signal gets diverted to the plugged-in remote start mode if the vehicle is plugged-in. At step 4-05*npn*, the HELD ING signal is diverted to the not-plugged-in remote start mode.

The following flow describes CRANK HOLD diversion. At step 4-06, the signal comes from the RSA system and is used to remote start the vehicle in both modes. It used by both plugged-in and not-plugged-in remote start modes. At step 4-06*h*, the process adds six extra seconds onto the remote starts provided CRANK signal, and this HELD CRANK signal gets diverted to the proper remote start process based on if the vehicle is plugged-in or not-plugged-in. At step 4-06*a*, the HELD CRANK signal is diverted to the correct remote start mode based on if the vehicle is plugged-in or not-plugged-in. At step 4-06*pn*, the HELD CRANK signal diverted to the plugged-in remote start mode if the vehicle is plugged-in. At step 4-06*npn*, the HELD CRANK signal is diverted to the not-plugged-in remote start mode. Step 4-07 is always running as background task.

The Press AC+AC C-ON Circuit Is Shown In FIG. 5.

The purpose of this circuit is to wait for the remote start request, then bring it from the "plug-in diversion" to wait just long enough for the factory key fob to be read by the car, then press the factory key fob's "AC" button. This will start the car in "AC MODE" while plugged in.

The "AC Start" positive 12-volt signal comes from the "plug-in diversion" circuit, and first passes thru a set of normally closed contacts on the "ac c-on" relay. This passes the positive 12-volt signal to two places. First it passes it thru an isolation diode to the "allow fob" circuit. This power's up and enables the factory key fob. It also passes this positive 12-volt signal into a 0.5 second time delay.

The positive 12-volt "ac start" signal comes into the resistor and capacitor. The capacitor is held discharged by the second resistor. Since this capacitor will appear as a temporary short to ground, all voltage will be pulled through it to ground, leaving zero volts at the gate tap off point to the MOSFET. As the capacitor takes a charge, in about 0.5 seconds there will be enough voltage at the tap-off point to make the MOSFET turn on. This causes a complete circuit to ground through the source and drain, giving power across the "press ac" relay coil. This closes the contacts to press the factory key fob's "AC" button.

"Allow fob" goes first because the positive 12-volt through the diode activates the "allow fob" with substantially no delay. As soon as the fob is powered up, the car can read its security code. Next, the relay closes approximately 0.5 seconds later, because the positive 12-volt "ac start" signal passes through the time-delay and closes the relay. When the relay closes, it jumps across the key fob's AC button. This will start the car in "AC MODE." Once the car starts in AC MODE, "AC C-ON" relay will energize.

Tap 2 is a wiretap in the car that goes above 5 volts when the car has been started in AC mode. This signal greater than 5-volts causes the MOSFET to conduct ground from its source to drain through the coil of the "AC C-ON" relay coil with respect to B+ on the other side of the coil. This energizes the relay. Doing so causes the normally closed contacts to open, and which cuts the positive 12-volt power to the rest of the AC start system. The "allow fob" shuts off, and the AC press releases. The car stays running in AC mode.

The other set of contacts that is normally open but is now closed connects common at positive 12-volts, and allows voltage to flow out the normally open but now closed contact. This positive 12-volt "AC C-ON" signal first flows through a normally closed set of contacts and can feed positive 12-volt power into a "Sequence Complete" circuit.

When car turns itself off under its built-in time out, or when the brake is pressed, or when the PTS button is pressed, this AC C-ON signal drops. Additionally, if a remote stop request comes in, it makes the IGN-IN relay energize and breaks the normally-closed contacts, which are now open, also causing the positive 12-volt AC C-ON to drop. Once dropped, the sequence sends a positive 12-volt pulse, telling the RSA that the car is no longer started or running.

Figure 6:
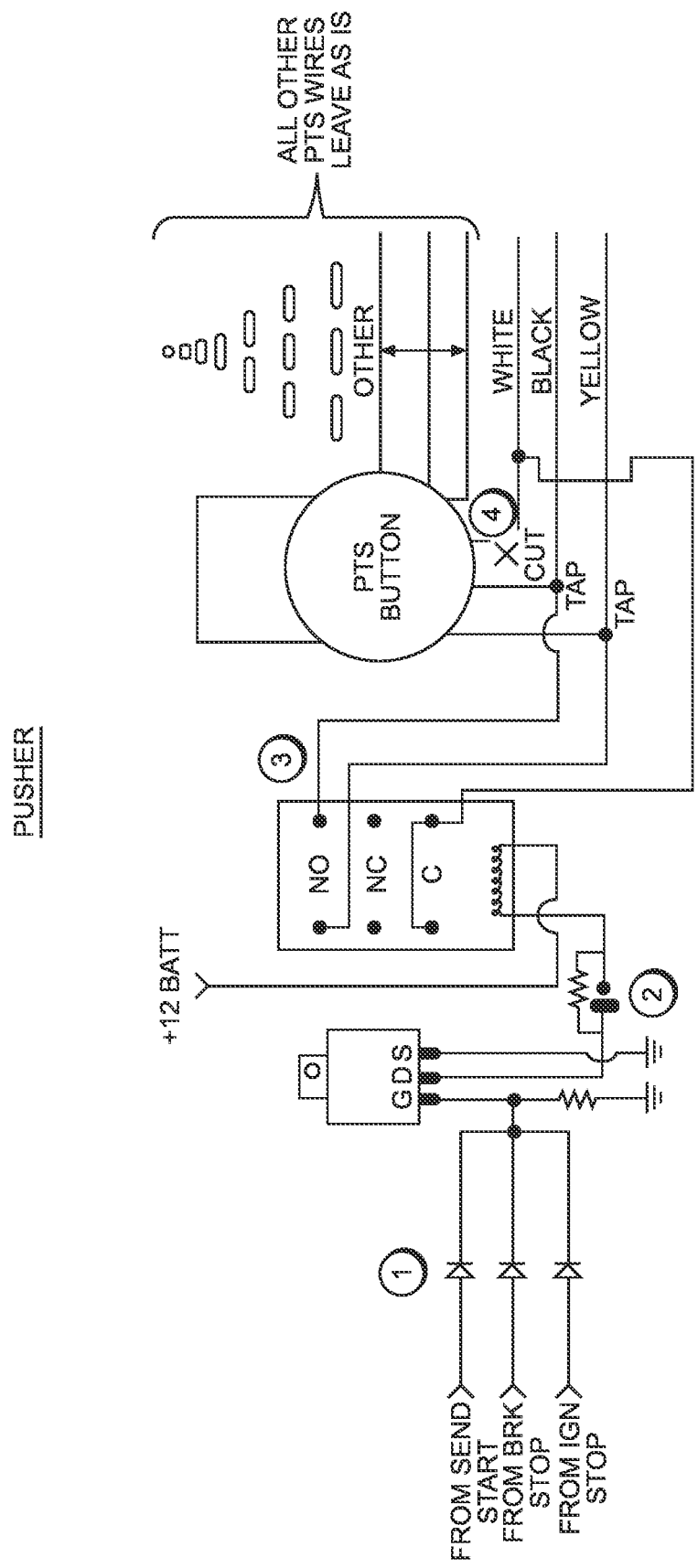
FIG. 6 depicts a schematic associated with Pusher functionality.
Figure 7:
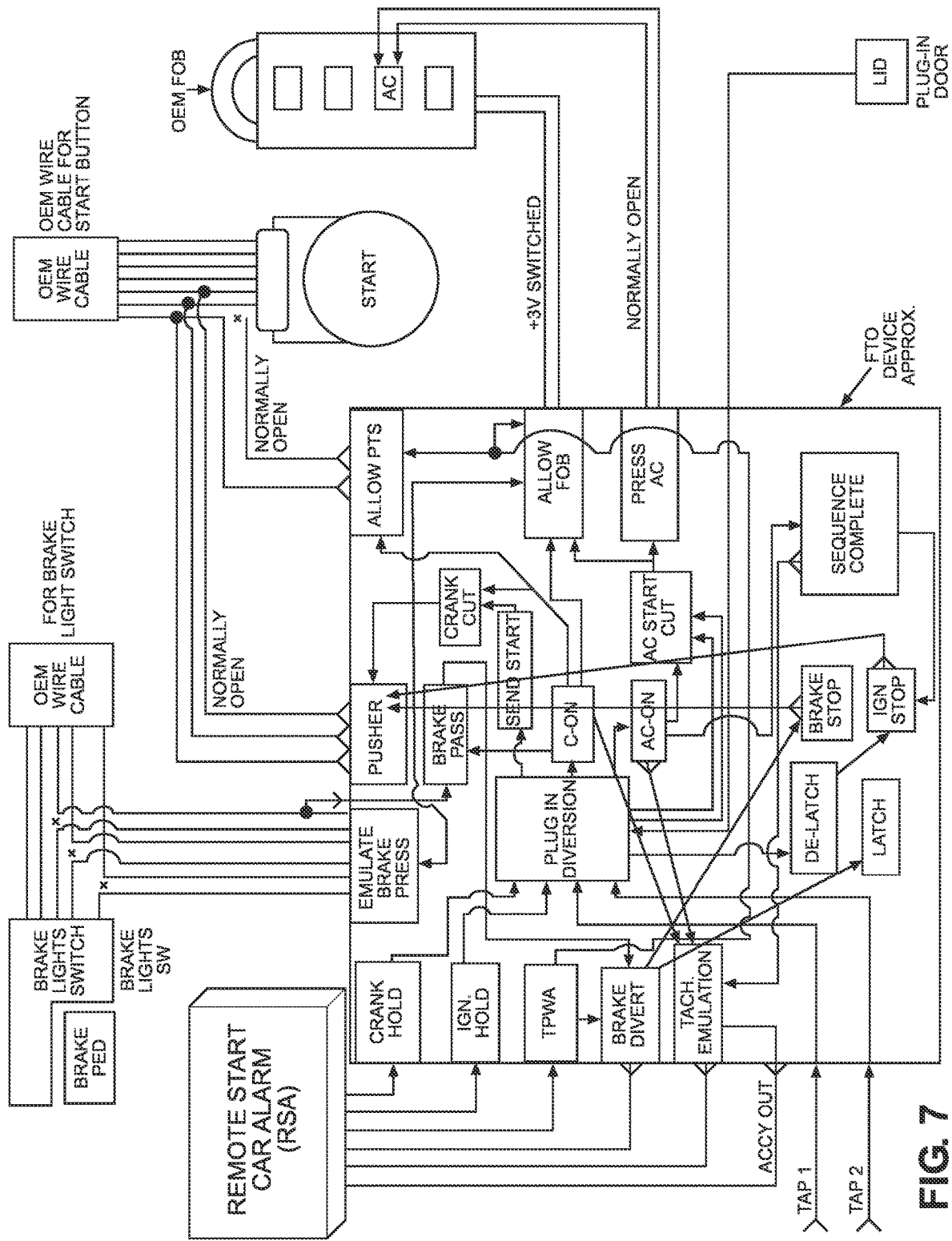
FIG. 7 depicts a schematic associated with Remote Start Car Alarm (RSA).

The Pusher Circuit Is Shown In FIG. 6. The purpose of this circuit is to take one of three possible input signals and then act upon it by pressing the car's Push-To-Start button (PTS). This push is done in a press-and-release manner, so as not to hold the button down. The pusher circuit does not determine the difference between a start or stop press. Other circuits in the system determine that and send their signals to this circuit to get the press-and-release done.

One of three signals come in and are isolated from feedback via diodes. The MOSFET senses the gate go positive, which completes the circuit with respect to ground. One side of the relay coil is connected to battery positive, which will negative-complete via the MOSFET and close the relay. This negative also passes through a capacitor that is always held in a discharged state by its mating resistor. This negative complete circuit will see this discharged capacitor as a short at first, closing the relay, but as voltage builds in the capacitor, after about one second, the relay will pop back open. The relay closes two open circuit wires connected to the normally-open push button itself.

Note that if the vehicle is remotely started while plugged in, the plug lid door must be open at the time of the remote start request. This would divert starting and monitoring signals to the plugged-in mode. If the plug is manually removed by the driver while started in this mode, that act alone will not abort this FACTORY AC MODE remote start. The vehicle is not drivable in this mode, and as soon as any attempt to drive the vehicle is made by the driver, the vehicle will shut down. The only exception to this would be the driver's door. The driver's door pin signal is blocked from the vehicle by the AC C-ON process. This gives the driver a chance to place his things into the vehicle without it shutting down. However, the vehicle is not drivable in this mode. Upon trying to put it in gear, a forced shutdown will ensue. The plug lid door must be closed to allow driving of the vehicle. Closing this lid will trigger PLUG-IN DIVERSION to disconnect TAP 2, and this will force the remotely started vehicle to shut down. This is required anyway, so that the vehicle can be re-remote started or manually restarted in normal not-plugged in mode.

If the vehicle is remotely started while not plugged in, and a plug is inserted, opening the plug door lid will not shut down the vehicle. However, inserting the plug will as the vehicle's software will not allow the vehicle to be driven with the plug inserted. This is a normal safety feature of the vehicle.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A method for remote starting a vehicle, comprising the steps of:
   detecting a remote start request;
   activating a key fob to allow for reading a security code, by powering up the fob and reading the security code from the memory of the fob;
   emulating an electrical brake pedal press;
   emulating an activation of the vehicle's start switch; and
   determining whether the vehicle has started.

2. The method of claim 1, further comprising the steps of:
   detecting whether an amount of time has elapsed; and
   if the amount of time has elapsed, aborting the start of the vehicle.

3. The method of claim 2, wherein the amount of time is approximately 4 seconds.

4. The method of claim 1, further comprising the steps of a driver unlocking the vehicle, opening a door, and driving the vehicle without the vehicle shutting down.

5. The method of claim 1, wherein the remote start request is received from an aftermarket key fob.

6. The method of claim 1, wherein emulating an electrical brake pedal press comprises the step of modifying the vehicle's information regarding brake pedal status.

7. The method of claim 1, wherein emulating an activation of the vehicle's start switch comprises using a press signal of a vehicle push start button.

8. The method of claim 1, wherein determining whether the vehicle has started comprises one or more of:
   detecting a vehicle signal indicating a started vehicle;
   detecting a vehicle battery voltage;
   detecting revolutions per minute of a vehicle engine; or
   detecting data from a vehicle's tachometer.

9. The method of claim 1, wherein the vehicle is a hybrid-electric vehicle supporting electric plug-in.

10. The method of claim 1, wherein the aftermarket key fob is part of a remote start alarm system.

11. A method for remote starting a vehicle, comprising the steps of:
   detecting a remote start request;
   detecting whether the vehicle has not already been started;
   generating an AC-Start signal;
   overriding a disabled on board factory key fob being kept offline;
   activating a Temp Allow Fob via the AC-START signal and bringing the onboard factory key fob online temporarily so that the onboard factory key fob can be used to request and authorize a factory remote start;
   trigger off the AC-Start signal;
   attempt to start an engine by emulating a press of a key fob remote start button, wherein the emulated press is held for a duration of time; and
   detecting whether the vehicle is started, and if the vehicle is not started, determining whether a time has elapsed since the attempt to start the vehicle, and if the time has not elapsed, attempting to start the engine again.

12. The method of claim 11, wherein the vehicle is a hybrid vehicle having an electric plug for charging.

13. The method of claim 12, wherein the vehicle is plugged-in.

14. The method of claim 11, wherein the remote start request is received from an aftermarket key fob.

15. The method of claim 11, wherein detecting whether the vehicle has not already been started comprises detecting a vehicle signal indicating a started vehicle.

16. The method of claim 11, wherein the emulated press is held until the vehicle is started or fails to start.

17. The method of claim 11, wherein the vehicle is a hybrid-electric sedan vehicle with push-to-start.

18. A system for remote starting a vehicle, comprising a circuit operable to:
   detect a remote start request;
   activate a key fob to allow for reading a security code, by powering up the key fob;
   emulate an electrical brake pedal press;
   emulate an activation of the vehicle's start switch; and
   determine whether the vehicle has started.

19. The system of claim 18, wherein the circuit is operable to start a hybrid vehicle that is not plugged in.

20. The system of claim 18, further comprising circuitry operable to:
   determine whether the vehicle has started by detecting a vehicle signal indicating a started vehicle, detecting a vehicle battery voltage, detecting revolutions per minute of the vehicle engine, or detecting data from the vehicle's tachometer.

\* \* \* \* \*